(12) United States Patent
Kramer et al.

(10) Patent No.: US 9,526,793 B1
(45) Date of Patent: Dec. 27, 2016

(54) SALTS OF PHENYLETHYLAMINES AND INORGANIC ACIDS AND METHODS OF USE THEREOF

(71) Applicants: Ronald Kramer, Phoenix, AZ (US); Alexander Nikolaidis, New Kallikratia (GR); Bruce Kneller, Howell, NJ (US)

(72) Inventors: Ronald Kramer, Phoenix, AZ (US); Alexander Nikolaidis, New Kallikratia (GR); Bruce Kneller, Howell, NJ (US)

( * ) Notice: Subject to any disclaimer, the term of this patent is extended or adjusted under 35 U.S.C. 154(b) by 359 days.

(21) Appl. No.: 13/917,023

(22) Filed: Jun. 13, 2013

(51) Int. Cl.
*A61K 31/137* (2006.01)
*A61K 47/48* (2006.01)
*A23L 1/187* (2006.01)

(52) U.S. Cl.
CPC .......... *A61K 47/48015* (2013.01); *A23L 1/187* (2013.01)

(58) Field of Classification Search
CPC .................................................... A61K 31/137
See application file for complete search history.

*Primary Examiner* — Jeffrey S Lundgren
*Assistant Examiner* — Chris Simmons
(74) *Attorney, Agent, or Firm* — Booth Udall Fuller, PLC

(57) ABSTRACT

Disclosed are salts of 2-phenylethylamines and deprotonated inorganic acids, compositions and formulations containing the same, and methods of making and using the salts, compositions and formulations.

9 Claims, 8 Drawing Sheets

US 9,526,793 B1

SALTS OF PHENYLETHYLAMINES AND INORGANIC ACIDS AND METHODS OF USE THEREOF

TECHNICAL FIELD

The present disclosure relates to the field of dietary supplements and pharmaceutical compositions including salts of Phenylethylamines and Nitrates or Nitrites for therapeutic uses including enhancing athletic performance, sexual function, and cognitive function.

BACKGROUND

Nutritional supplements and approaches for enhancing an athlete's performance (e.g., increasing muscle strength, reducing fatigue, increasing endurance, reducing adiposity or fat, etc.) have become popular exigencies in various sports and bodybuilding regimes. However as athletes continually strive for improved muscle performance, there is a continuing need for more effective technologies to aid in increasing performance.

Erectile dysfunction (ED), the most common sexual arousal disorder, involves partial or complete failure to attain or maintain a penile erection adequately for sexual intercourse. Erectile dysfunction is a very common problem, affecting from about 40 to 60 percent of men at some time in their life, and about 52 percent of men between 40 and 70 years old. There is a need for more effective treatments of sexual disorders such as erectile dysfunction as well as decreased libido and other orgasm disorders. The compositions and methods of the present disclosure address these needs.

SUMMARY

Work described herein relates to salts of Phenylethylamines (aka "PEA" or "PEA's") including a deprotonated inorganic acid; in some implementations the deprotonated inorganic acid is nitric acid. In some implementations the deprotonated inorganic acid is nitrous acid. In certain aspects the salt is selected from the group consisting of a PEA Nitrate, and PEA Nitrite.

Work described herein also relates to compositions including at least one (i.e., one or more) salt of a PEA including and a deprotonated inorganic acid; in some implementations the deprotonated inorganic acid is nitric acid. In some implementations the deprotonated inorganic acid is nitrous acid. In certain implementations the salt is selected from the group consisting of 2-phenylethylamine nitrate, and 2-phenylethylamine nitrite.

In some implementations the composition exhibits (i.e., causes in a human or animal to whom it is administered) reduced time to the initial onset of enhanced athletic performance in comparison with a molar equivalent amount of base PEA's or other salts of PEA's.

In other implementations the composition exhibits (i.e., causes in a human or animal to whom it is administered) increased time of the effects of enhanced athletic performance in comparison with a molar equivalent amount of base PEA's or other salts of PEA's.

Still in other implementations the composition exhibits (i.e., causes in a human or animal to whom it is administered) increased oral bioavailability in comparison with a molar equivalent amount of base PEA's or other salts of PEA's thereby reducing the amount of PEA's needed to be administered orally to enhance athletic performance in comparison with a molar equivalent amount of base PEA's or other salts of PEA's.

Still in yet other implementations the composition exhibits (i.e., causes in a human or animal to whom it is administered) increased plasma half life in comparison with a molar equivalent amount of base PEA's or other salts of PEA's thereby increasing the time or amount of effect of enhanced athletic performance in comparison with a molar equivalent amount of base PEA's or other salts of PEA's.

Still in yet other implementations the composition exhibits (i.e., causes in a human or animal to whom it is administered) the abilities to reduce appetite, increase rate of fat loss, enhance cognitive function, enhance sense of well-being, increase memory function, enhance memory function, improve cardiovascular and/or peripheral vascular health, increase cerebral vascular blood flow, increase hepato-renal blood flow, reduce the incidence of cerebral vascular accidents or strokes, reduce the incidence of peripheral and cardiac embolism/thrombotic event or other vaso-occlusive events (e.g., strokes, peripheral blood clots, deep vein thrombosis or myocardial infarction), increase the recovery rate from and/or overall level of recovery from any vascular embolism/thrombotic event.

Still in yet other implementations the composition exhibits (i.e., causes in a human or animal to whom it is administered) the ability to improve absorption of PEA's from the gastrointestinal tract as well as the ability to improve pharmacokinetic properties of PEA's (e.g., by increasing plasma-half life, and/or reducing time to maximal plasma concentration and/or increase maximal plasma concentration levels).

Still in yet other implementations the composition exhibits (i.e., causes in a human or animal to whom it is administered) an increase in libido and/or sexual desire, and/or ability to obtain and/or maintain an erection. The composition also exhibits the ability to enhance and/or improve erectile function of the penis in men by increasing blood flow and volume to the corpus cavernosum of the penis leading to improved rigidity and sensitivity of the penis and thus, sexual pleasure. In women, the composition exhibits the ability to enhance sexual pleasure by a homologous action; increasing blood flow and volume to the corpus cavernosum clitoridis, the sponge-like regions of erectile tissue containing most of the blood in the clitoris during clitoral erection. This leads to increased and improved clitoral erection and prolonged and/or enhanced sexual pleasure in women.

In certain aspects the composition further includes a pharmaceutically acceptable excipient. In certain implementations the composition is formulated for oral use.

Work described herein also relates to formulations including at least one salt of a PEA and a deprotonated nitric acid or at least one salt of a PEA and a deprotonated nitrous acid. In certain implementations the formulation is in a dosage form selected from the group consisting of a tablet, a chewable tablet, a capsule, a caplet, a lozenge, a troche, an oral gel, a buccal pouch, a granule, a pill, a gel, a bar, a pudding, and a powder. In certain implementations the formulation includes an additional nutritional supplement.

Work described herein also relates to a method of increasing athletic performance in an animal including administering to the animal an effective amount of at least one salt of a PEA and a deprotonated nitric acid and/or administering to the animal an effective amount of at least one salt of a PEA and a deprotonated nitrous acid. In some implementations the effective amount is from on about 0.005 grams per day to on about 3.00 grams per day. In some implementations the salt is administered orally.

In some implementations the salt exhibits reduced time to the initial onset of enhanced athletic performance in comparison with a molar equivalent amount of base PEA's or other salts of PEA's.

In other implementations the salt exhibits an increased duration of enhanced athletic performance in comparison with a molar equivalent amount of base PEA's or other salts of PEA's.

Still in yet other implementations the composition exhibits (i.e., causes in a human or animal to whom it is administered) the abilities to reduce appetite, increase rate of fat loss, enhance cognitive function, enhance sense of well-being, increase memory function, enhance memory function, improve cardiovascular and/or peripheral vascular health, increase cerebral vascular blood flow, increase hepato-renal blood flow, reduce the incidence of cerebral vascular accidents or strokes, reduce the incidence of peripheral and cardiac embolism/thrombotic event or other vaso-occlusive events (e.g., strokes, peripheral blood clots, deep vein thrombosis or myocardial infarction), increase the recovery rate from and/or overall level of recovery from any vascular embolism/thrombotic event and/or other vaso-occlusive event.

Still in yet other implementations the composition exhibits (i.e., causes in a human or animal to whom it is administered) the ability to improve absorption of PEA's from the gastrointestinal tract as well as the ability to improve pharmacokinetic properties of PEA's (e.g., by increasing plasma-half life, and/or reducing time to maximal plasma concentration and/or increasing maximal plasma concentration levels).

Work described herein also relates to methods of making a salt of a PEA and a deprotonated nitric acid and making a salt of a PEA and a deprotonated nitrous acid including solvating the desired PEA and nitric acid into a solution of distilled and deionized water; waiting for crystals to form; and removing the formed crystals out of the solution which will form PEA Nitrate salts and/or solvating the desired PEA and nitrous acid into a solution of distilled and deionized water; waiting for crystals to form; and removing the formed crystals out of the solution which will form PEA Nitrite salts.

DETAILED DESCRIPTION

Figure 1A:
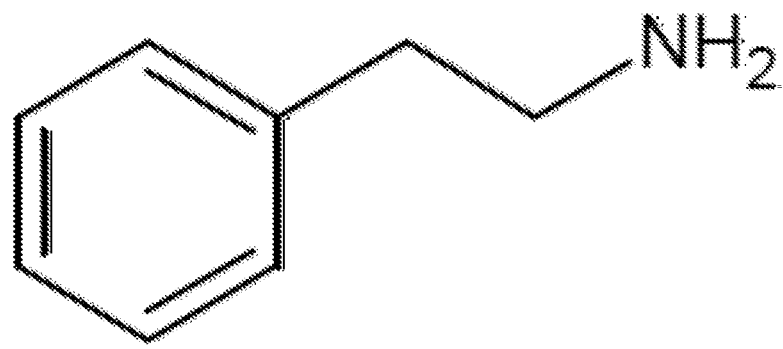
FIG. 1A shows the structure of 2-phenylethylamine (PEA)
Figure 1B:
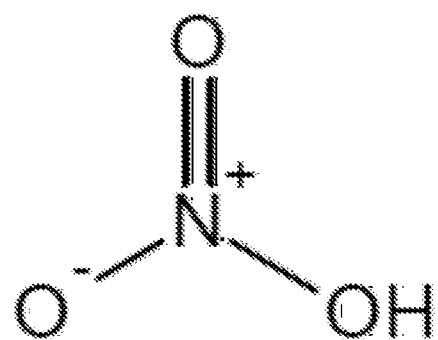
FIG. 1B shows the structure of nitric acid.
Figure 1C:
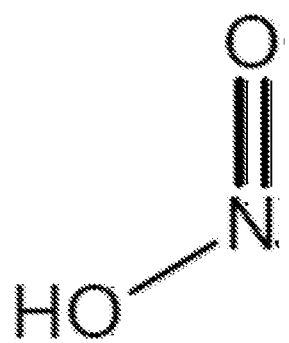
FIG. 1C shows the structure of nitrous acid.

In the following description, for the purposes of explanation, numerous specific details are set forth in order to provide a thorough understanding of the present disclosure. It will be apparent, however, to one skilled in the art that the present disclosure is not so limited.

As used herein, the verbs "comprise" and "include" as used in this description and in the claims and their conjugations are used in their non-limiting sense to mean that items following the words are included, but items not specifically mentioned are not excluded. In addition, reference to an element by the indefinite article "a" or "an" does not exclude the possibility that more than one of the elements are present, unless the context clearly requires that there is one and only one of the elements. The indefinite article "a" or "an" thus usually means "at least one".

As used herein, the term "subject" or "patient" refers to any vertebrate including, without limitation, humans and other primates (e.g., chimpanzees and other apes and monkey species), farm animals (e.g., cattle, sheep, pigs, goats and horses), domestic mammals (e.g., dogs and cats), laboratory animals (e.g., rodents such as mice, rats, and guinea pigs), and birds (e.g., domestic, wild and game birds such as chickens, turkeys and other gallinaceous birds, ducks, geese, and the like). In some implementations, the subject may be a mammal. In other implementations, the subject may be a human.

As used herein, "Composition" is a term used in its broadest sense and may refer to a mixture of constituent substances or ingredients. "Mixture" is a term used in its broadest sense and may refer to two or more constituent substances or ingredients (chemical species present in a system) which have been combined (not necessarily in fixed proportions and not necessarily with chemical bonding and not necessarily so that each substance retains its own chemical identity). Mixtures can be the product of a blending or mixing of chemical substances like elements and compounds, without chemical bonding or other chemical change, so that each ingredient substance retains its own chemical properties and makeup. Mixtures can be either homogeneous or heterogeneous. A homogeneous mixture is a type of mixture in which the composition is uniform. A heterogeneous mixture is a type of mixture in which the composition can easily be identified, as there are two or more phases present. A homogeneous mixture in which there is both a solute and solvent present is also a solution.

A "Compound" is a term used in its broadest sense and may refer to a chemical substance comprising two or more different chemically bonded chemical constituent elements or ingredients, with a fixed ratio or proportion by weight. The atoms within a compound can be held together by a variety of interactions, ranging from covalent bonds to electrostatic forces in ionic bonds. The physical and chemical properties of compounds are different from those of their constituent elements. This is one of the main criteria for distinguishing a compound from a mixture of elements or other substances because a mixture's properties are generally closely related to and dependent on the properties of its constituents. However, some mixtures are so intimately combined that they have some properties similar to compounds. Another criterion for distinguishing a compound from a mixture is that the constituents of a mixture can usually be separated by simple, mechanical means such as filtering, evaporation, or use of a magnetic force, but the components of a compound can only be separated by a chemical reaction. Conversely, mixtures can be created by mechanical means alone, but a compound can only be created (either from elements or from other compounds, or a combination of the two) by a chemical reaction.

Thus, for purposes of this disclosure, "Composition" may refer to a mixture of at least one Phenylethylamine in combination with at least a Nitrate, a Nitrite, or both from any source.

As used herein, "Nitrate" is a term used in its broadest sense and may refer to an Nitrate in its many different chemical forms including a single administration Nitrate, its physiologically active salts or esters, its combinations with its various salts, its tautomeric, polymeric and/or isomeric forms, its analog forms, and/or its derivative forms. Nitrate comprises, by way of non-limiting example, many different chemical forms including dinitrate and trinitrate. Additionally, for the exemplary purposes of this disclosure, Nitrate may include nitrate esters such as nitroglycerine, and the like.

As used herein, a "Nitrate Salt" refers to salts, or mixed salts, of Nitric Acid and includes one Nitrogen atom and three Oxygen atoms. For the exemplary purposes of this disclosure, a Nitrate Salt may include salts of Nitrate such as sodium nitrate, potassium nitrate, barium nitrate, calcium nitrate, and the like. For the exemplary purposes of this disclosure, a Nitrate Salt may include mixed salts of Nitrate such as nitrate orotate, and the like.

A "Natural Nitrate" is a term used to describe a natural source of a Nitrate. For the exemplary purposes of this disclosure, Natural Nitrates that are commonly used in the supplement industry include a juice, extract, powder and the like of Cabbage, Spinach, Beetroot, Artichoke, Asparagus, Broad Bean, Eggplant, Garlic, Onion, Green Bean, Mushroom, Pea, Pepper, Potato, Summer Squash, Sweet Potato, Tomato, Watermelon, Broccoli, Carrot, Cauliflower, Cucumber, Pumpkin, Chicory, Dill, Turnip, Savoy Cabbage, Celeriac, Chinese Cabbage, Endive, Fennel, Kohlrabi, Leek, Parsley, Celery, Cress, Chervil, Lettuce, Rocket (Rucola), and the like.

As used herein, "Nitrite" is a term used in its broadest sense and may refer to an Nitrite in its many different chemical forms including a single administration Nitrite, its physiologically active salts or esters, its combinations with its various salts, its tautomeric, polymeric and/or isomeric forms, its analog forms, and its derivative forms. Nitrite comprises, by way of non-limiting example, many different chemical forms including dinitrite and trinitrite. Additionally, for the exemplary purposes of this disclosure, Nitrite may comprise nitrite esters such as amyl nitrite, and the like.

As used herein, a "Nitrite Salt" refers to salts, or mixed salts, of Nitrous Acid ($HNO_2$) and includes one Nitrogen atom and two Oxygen atoms ($NO_2$). For the exemplary purposes of this disclosure, a Nitrite Salt may include salts of Nitrite such as sodium nitrite, potassium nitrite, barium nitrite, calcium nitrite, and the like. For the exemplary purposes of this disclosure, a Nitrite Salt may comprise mixed salts of Nitrite such as nitrite orotate, and the like.

A "Natural Nitrite" is a term used to describe a natural source of a Nitrite. For the exemplary purposes of this disclosure, Natural Nitrites that are commonly used in the supplement industry include a juice, extract, powder and the like of Cabbage, Spinach, Beetroot, Artichoke, Asparagus, Broad Bean, Eggplant, Garlic, Onion, Green Bean, Mushroom, Pea, Pepper, Potato, Summer Squash, Sweet Potato, Tomato, Watermelon, Broccoli, Carrot, Cauliflower, Cucumber, Pumpkin, Chicory, Dill, Turnip, Savoy Cabbage, Celeriac, Chinese Cabbage, Endive, Fennel, Kohlrabi, Leek, Parsley, Celery, Cress, Chervil, Lettuce, Rocket (Rucola), and the like.

Nitrates and Nitrites are commercially available in various preparations, including natural preparations, and are used in various applications. In the case of ingestion by humans, Nitrate ($NO_3$) is typically reduced to Nitrite ($NO_2$) in the epithelial cells of blood vessels. In vivo, Nitrite ($NO_2$) reacts with a thiol donor, principally glutathione, to yield Nitric Oxide (NO).

As used herein, the term "alkyl" refers to hydrocarbon containing normal, secondary, tertiary or cyclic carbon atoms. For example, an alkyl group can have 1 to 20 carbon atoms (i.e, $C_1$-$C_{20}$ alkyl), 1 to 10 carbon atoms (i.e., $C_1$-$C_{10}$ alkyl), or 1 to 6 carbon atoms (i.e., $C_1$-$C_6$ alkyl). Examples of suitable alkyl groups include, but are not limited to, methyl (Me, —$CH_3$), ethyl (Et, —$CH_2CH_3$), 1-propyl (n-Pr, n-propyl, —$CH_2CH_2CH_3$), 2-propyl (i-Pr, i-propyl, —$CH(CH_3)_2$), 1-butyl (n-Bu, n-butyl, —$CH_2CH_2CH_2CH_3$), 2-methyl-1-propyl (i-Bu, i-butyl, —$CH_2CH(CH_3)_2$), 2-butyl (s-Bu, s-butyl, —$CH(CH_3)CH_2CH_3$), 2-methyl-2-propyl (t-Bu, t-butyl, —$C(CH_3)_3$), 1-pentyl (n-pentyl, —$CH_2CH_2CH_2CH_2CH_3$), 2-pentyl (—$CH(CH_3)CH_2CH_2CH_3$), 3-pentyl (—$CH(CH_2CH_3)_2$), 2-methyl-2-butyl (—$C(CH_3)_2CH_2CH_3$), 3-methyl-2-butyl (—$CH(CH_3)CH(CH_3)_2$), 3-methyl-1-butyl (—$CH_2CH_2CH(CH_3)_2$), 2-methyl-1-butyl (—$CH_2CH(CH_3)CH_2CH_3$), 1-hexyl (—$CH_2CH_2CH_2CH_2CH_2CH_3$), 2-hexyl (—$CH(CH_3)CH_2CH_2CH_2CH_3$), 3-hexyl (—$CH(CH_2CH_3)(CH_2CH_2CH_3)$), 2-methyl-2-pentyl (—$C(CH_3)_2CH_2CH_2CH_3$), 3-methyl-2-pentyl (—$CH(CH_3)CH(CH_3)CH_2CH_3$), 4-methyl-2-pentyl (—$CH(CH_3)CH_2CH(CH_3)_2$), 3-methyl-3-pentyl (—$C(CH_3)(CH_2CH_3)_2$), 2-methyl-3-pentyl (—$CH(CH_2CH_3)CH(CH_3)_2$), 2,3-dimethyl-2-butyl (—$C(CH_3)_2CH(CH_3)_2$), 3,3-dimethyl-2-butyl (—$CH(CH_3)C(CH_3)_3$), and octyl (—$(CH_2)_7CH_3$).

As used herein, the term "aryl" refers to an aromatic hydrocarbon radical derived by the removal of one hydrogen atom from a single carbon atom of a parent aromatic ring system. For example, an aryl group can have 1 to 20 carbon atoms, 1 to 4 carbon atoms, 4 to 20 carbon atoms, 4 to 18 carbon atoms, 4 to 16 carbon atoms, 4 to 14 carbon atoms, 4 to 12 carbon atoms, 4 to 10 carbon atoms, 4 to 8 carbon atoms, or 4 to 6 carbon atoms. Typical aryl groups include, but are not limited to, radicals derived from benzene (e.g., phenyl), substituted benzene, naphthalene, anthracene, biphenyl, and the like.

As used herein, the term "substituted alkyl" means alkyl in which one or more hydrogen atoms are each independently replaced with a non-hydrogen substituent.

As used herein, the term "heteroalkyl" refers to an alkyl group where one or more carbon atoms have been replaced with a heteroatom, such as, O, N, or S. For example, if the carbon atom of the alkyl group which is attached to the parent molecule is replaced with a heteroatom (e.g., O, N, or S) the resulting heteroalkyl groups are, respectively, an alkoxy group (e.g., —$OCH_3$, etc.), an amine (e.g., —$NHCH_3$, —$N(CH_3)_2$, etc.), or a thioalkyl group (e.g., —$SCH_3$). A heteroalkyl group can have, for example, 1 to 20 carbon atoms, 1 to 4 carbon atoms, 4 to 20 carbon atoms, 4 to 18 carbon atoms, 4 to 16 carbon atoms, 4 to 14 carbon atoms, 4 to 12 carbon atoms, 4 to 10 carbon atoms, 4 to 8 carbon atoms, or 4 to 6 carbon atoms. A $C_1$-$C_6$ heteroalkyl group means a heteroalkyl group having 1 to 6 carbon atoms.

As used herein, the term "Phenylethylamine" (aka "PEA") refers to a compound of Formula I:

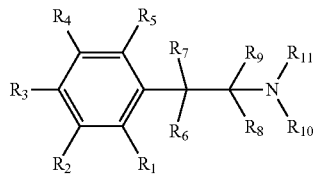

wherein $R_1$, $R_2$, $R_3$, $R_4$, $R_5$, $R_6$, $R_7$, $R_8$, $R_9$, $R_{10}$, and $R_{11}$ independently represent an alkyl, an aryl, a substituted alkyl, a heteroalkyl, a hydroxyl, or a hydrogen.

As used herein, the term "sexual function" refers to the ability to engage in and maintain sexual intercourse for a period of time including the ability to generate a penile or clitoral erection (i.e., erectile genesis) and to maintain such an erection.

The present disclosure relates to compounds, compositions and formulations comprising, consisting essentially of, or consisting of stable salts of a PEA and deprotonated inorganic acids, as well as to methods for making said compounds, compositions and formulations. An exemplary salt of a PEA and a deprotonated inorganic acid is a salt of a PEA and a deprotonated nitric acid (i.e., 2-phenylethylamine nitrate). The compounds, compositions, and formulations of the present disclosure provide enhanced and synergistic nutritional and/or therapeutic efficacy as compared to their individual effects.

In certain implementations, the present disclosure relates to Compounds, Compositions, dietary supplements, and formulations comprising, consisting essentially of, or consisting of a Phenylethylamine and one or more of a Nitrate, a Nitrate Salt, a Natural Nitrate, a Nitrite, a Nitrite Salt, and a Natural Nitrite. In one implementation, the disclosure relates to a Composition, dietary supplement, or formulations comprising, consisting essentially of, or consisting of a Phenylethylamine and a juice, extract, powder or the like of Beetroot.

Additionally, the disclosure relates to administration of the compound, composition or formulation to a human or animal as a means for improving athletic function/performance or cognitive function. As used herein, "athletic function" refers to any one or more physical attributes dependent on skeletal muscle contraction. For example, athletic functions include, but are not limited to, maximal muscular strength, muscular endurance, running speed and endurance, swimming speed and endurance, throwing power, lifting and pulling power. As used herein, "cognitive function" refers to any mental component of brain function. For example, cognitive functions include, but are not limited to, attention, concentration, memory and focus.

Additionally, the disclosure relates to the administration of the compound, composition or formulation to a human or animal as a means to reduce appetite, and/or increase rate of fat loss, and/or enhance cognitive function, and/or enhance sense of well-being, and/or increase memory function, enhance memory function.

Further, the disclosure relates to the administration of the compound, composition or formulation to a human or animal as a means to improve cardiovascular and/or peripheral vascular health, and/or increase cerebral vascular blood flow, and/or increase hepato-renal blood flow, and/or reduce the incidence of cerebral vascular accidents or strokes, and/or reduce the incidence of peripheral and cardiac embolism/thrombotic event or other vaso-occlusive events (e.g., strokes, peripheral blood clots, deep vein thrombosis, or myocardial infarction), and/or increase the recovery rate from and/or overall level of recovery from any vascular embolism/thrombotic event or any other vaso-occlusive event.

Still in yet other implementations the composition exhibits (i.e., causes in a human or animal to whom it is administered) the ability to improve absorption of PEA's from the gastrointestinal tract as well as the ability to improve pharmacokinetic properties of PEA's (e.g., by increasing plasma-half life, and/or reducing time to maximal plasma concentration and/or increasing maximal plasma concentration levels).

Still in yet other implementations the composition exhibits (i.e., causes in a human or animal to whom it is administered) an increase in libido and/or sexual desire, and/or ability to obtain and/or maintain an erection. The composition also exhibits the ability to enhance and/or improve erectile function of the penis in men by increasing blood flow and volume to the corpus cavernosum of the penis leading to improved rigidity and sensitivity of the penis and thus, sexual pleasure. In women, the composition exhibits the ability to enhance sexual pleasure by a homologous action: increasing blood flow and volume to the corpus cavernosum clitoridis, the sponge-like regions of erectile tissue containing most of the blood in the clitoris during clitoral erection. This leads to increased clitoral erection and prolonged and/or enhanced sexual pleasure in women.

Applicants have discovered that Nitrates and Nitrites of a Phenylethylamine, when administered to a subject, provide enhanced nitric oxide production while providing improved vasodilation effects over the single administration of a Phenylethylamine, the single administration of a Nitrate, or the single administration of Nitrite. Improved vasodilation may, in turn, provide better circulation and distribution of the Phenylethylamine in the body. Bioabsorption is improved because Phenylethylamine salts with inorganic acids are much more water-soluble than single administration Phenylethylamines. Applicants have also discovered that the vasodilating effect of a Nitrate or Nitrite of a Phenylethylamine manifests as fast as any Nitrate, since the $NO_3$ group of the salt requires minimal conversion to yield nitric oxide.

In conventional preparations of Nitrate compounds, "tolerance," a particular side effect, has been observed in many patients. This is unfortunate because the effectiveness of Nitrate on vasodilation is well documented. "Tolerance" occurs when a subject's reaction to Nitrate decreases so that larger doses are required to achieve the same effect. A report in the British Journal of Pharmacology indicates "tolerance to the dilator effects of nitrates remains a persisting therapeutic problem." R. J. MacAllister, Br J Pharmacol. 2000 May; 130(2): 209-210. The development of tolerance to the Nitrate component of the molecule may be prevented with the presence of the Phenylethylamine.

It is well known by those skilled in the art that to elucidate a desired effect from a PEA, many PEA's require the administration of the PEA in exceptionally large doses and/or very frequent dosing of the PEA due in part to rapid deamination of the PEA by various monoamine oxidase enzymes which are found in the alimentary canal, in the blood plasma and in various organ tissues. This is impractical and inconvenient. What are needed are better compositions of PEA's and/or methods of use of PEA's to overcome these impractical and inconvenient limitations.

Acids are proton donor(s), have a sour taste (e.g., lime juice and vinegar), and can react with bases and produce water as a byproduct. Acids can react with metals and form hydrogen gas. A strong acid is an acid that completely ionizes in solution and donates protons. A weak acid is an acid that incompletely dissociates and generates fewer numbers of protons. The acid dissociation constant "Ka" of an acid indicates the ability of the acid to lose a proton. Acids are represented in the pH scale ranging from a pH of 0 to 7, with many acids having pHs of between 1 and 6. An acid with pH 1 is said to be very strong, and as the pH value increases, acidity is decreased. All acids can be categorized as either organic acids or inorganic acids, depending on their chemical composition.

An organic acid is an acid that contains in its formula carbon, hydrogen, and at least one other element (e.g., oxygen). Organic acids occur in, or can be produced from, biological origins, such as, for example, animal and vegetable matter. Nucleic acids and amino acids are organic. Other common organic acids include acetic acid, found in vinegar and cider; citric acid, found in citrus fruits, gooseberries, and currants; tannic acid (tannin), found in oak galls; formic acid, which occurs in insects and plants; lactic acid, a constituent of sour milk; oleic acid, found in animal fats and vegetable oils and humans; and oxalic acid, found in rhubarb, spinach, and other edible plants. These acids almost always possess a —COOH (carboxyl) functional group. Sometimes organic compounds having only —OH (hydroxyl) or —SH (thiol) functional groups act as acids as well. For example, alcohols have some acidic properties. Organic acids are almost always weak acids and are usually, with rare exception, insoluble in water and soluble in organic solvents. Organic acids are used as food additives; often they are found in medicines, in dyeing and bleaching solutions, and are used in the tanning of leather.

Inorganic acids are also known as mineral acids as they are often derived from mineral sources. As used herein, "inorganic acid" refers to a chemical compound that is composed of hydrogen and one or more electronegative elements and does not contain carbon atoms. Inorganic acids dissociate in aqueous solution, releasing hydrogen ions (protons) and lowering the pH of the solution. Inorganic acids are typically stronger acids than organic acids. Inorganic acids are generally soluble in water and insoluble in organic solvents. Inorganic acids are highly reactive with metals, and they have a much higher corrosive ability than organic acids. Inorganic acids are often used in the manufacture of fertilizers, plastics, explosives, synthetic textiles, paints, and as solvents for other compounds. Thus, the properties of inorganic acids vary significantly from the properties of organic acids.

In some implementations, a compound of the present disclosure consists of a salt of a PEA and a deprotonated inorganic acid. As used herein, a "deprotonated inorganic acid" refers to an inorganic acid which has lost one or more hydrogen atoms. Examples of inorganic acids which can be deprotonated and form the salts of the present disclosure include, but are not limited to hydrochloric acid, phosphoric acid, nitric acid, nitrous acid, boric acid, and sulfuric acid.

2-phenylethylamine (CAS Registry No. 64-04-0, sometimes known as Benzeneethanamine or beta-phenylethylamine), having a molecular formula of $C_8H_{11}N_1$ and a molecular weight of about 121.1819, is an organic compound and a natural monoamine alkaloid, a trace amine, and also the name of a class of chemicals with many members well known for psychoactive drug and stimulant effects. 2-phenylethylamine functions as a neuromodulator or neurotransmitter in the mammalian central nervous system. It is biosynthesized from the amino acid phenylalanine via enzymatic decarboxylation. In addition to its presence in mammals, 2-phenethylamine is found in many other organisms and foods, such as chocolate, especially after microbial fermentation. It is sold as a dietary supplement for purported mood and weight-loss related therapeutic effects as well as for increasing overall athletic performance; however, orally ingested 2-phenethylamine is usually inactive because of extensive deamination in the intestines by monoamine oxidase (MAO) and extensive first-pass hepatic metabolism by monoamine oxidase (MAO) into phenylacetic acid. This prevents significant concentrations from reaching the brain unless exceptionally large and frequent doses are administered orally.

The group of phenylethylamine derivatives (PEA's) is referred to as the "Phenylethylamines." These are a series of broad and diverse classes of compounds derived from 2-phenylethylamine that include stimulants, psychedelics, and entactogens as well as anorectics, bronchodilators, decongestants and antidepressants among others.

2-phenethylamine is a primary amine, the amino-group being attached to a benzene ring through a two-carbon, or ethyl group. It is a colorless liquid at room temperature. 2-phenethylamine is soluble in water, ethanol and ether. Similar to other low-molecular-weight amines, it has a fishy odor. Upon exposure to air, it forms a solid carbonate salt with carbon dioxide. 2-phenethylamine is strongly basic with a $pK_b$=4.17 (or $pK_a$=9.83), as measured using the HCl salt, and forms a stable crystalline hydrochloride salt with a melting point of 217° C. and a density of 0.962 g/ml.

Abnormally low concentrations of endogenous 2-phenethylamine are found in those suffering from attention-deficit hyperactivity disorder (ADHD). 2-phenylethylamine's half-life is 5 to 10 minutes. It is metabolized by the enzymes monoamine oxidase A, monoamine oxidase B, aldehyde dehydrogenase and dopamine-beta-hydroxylase. When the initial 2-phenylethylamine brain concentration is low, brain levels can be increased almost 1000-fold when taking an MAO inhibitor (MAOI), and by 3-4 times when the initial concentration is high.

Supplementation with various PEA's are well known by those skilled in the art to increase athletic performance by reducing fatigue or reducing the onset of fatigue due to their central nervous system stimulant properties and mood enhancing abilities.

Additionally, the administration of various PEA's are well known by those skilled in the art to have inotropic and/or chronotropic effects as well as localized and systemic effects on hemodynamics via the modulation of vascular tone.

Figure 2A:
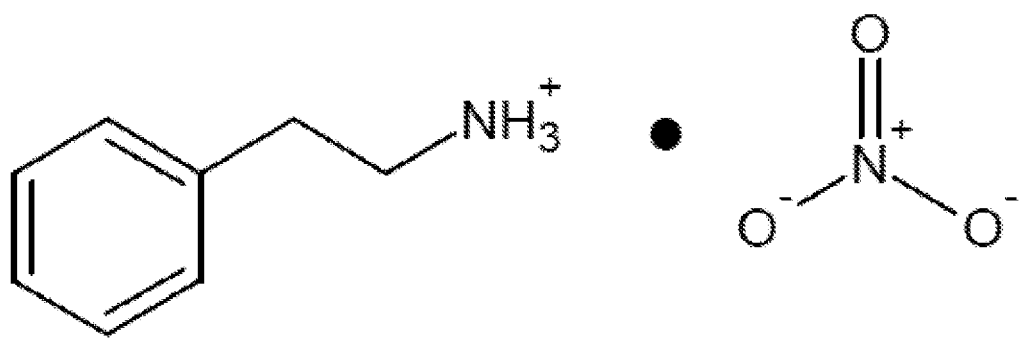
FIG. 2A shows the structure of 2-phenylethylamine nitrate salt (aka 2-phenylethanaminium nitrate)
Figure 2B:
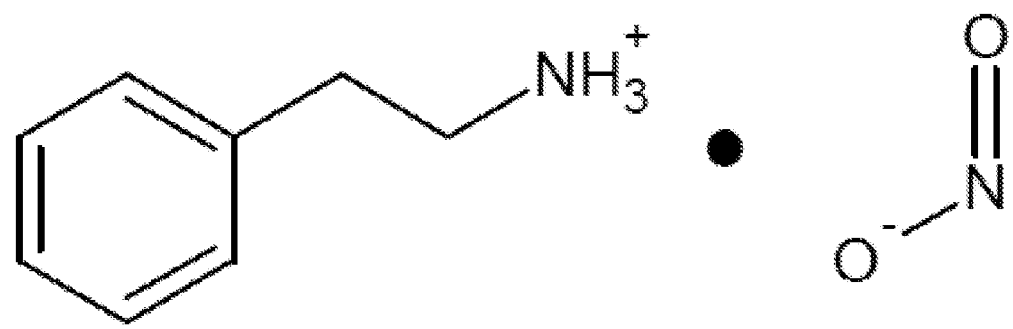
FIG. 2B shows the structure of 2-phenylethylamine nitrite salt (aka 2-phenylethanaminium nitrite).
Figure 3A:
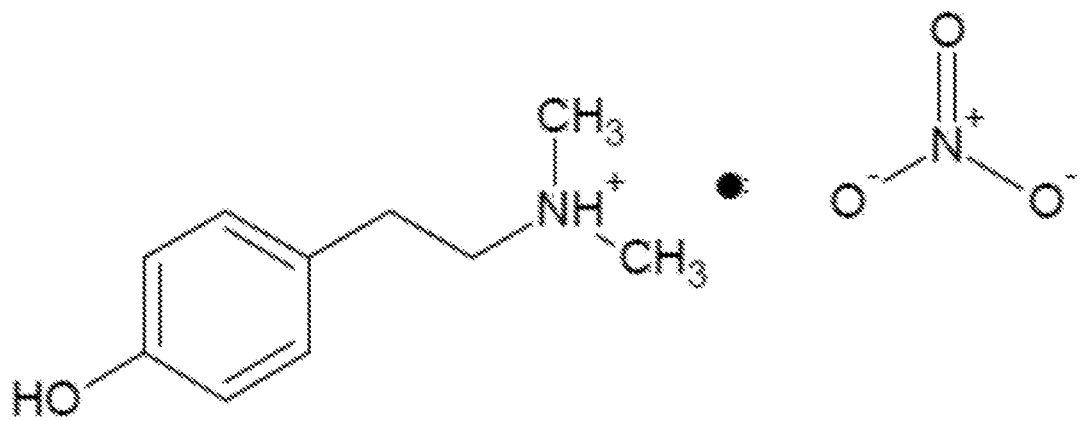
FIG. 3A depicts hordenine nitrate.
Figure 3B:
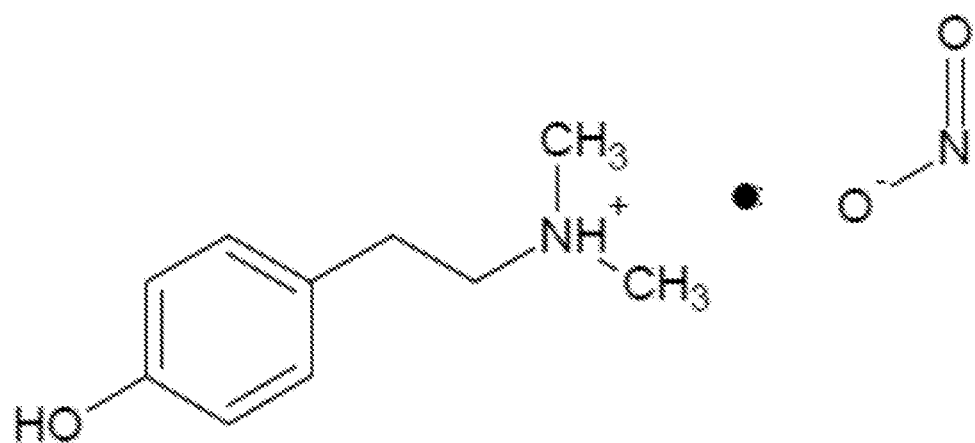
FIG. 3B depicts hordenine nitrite.
Figure 4A:
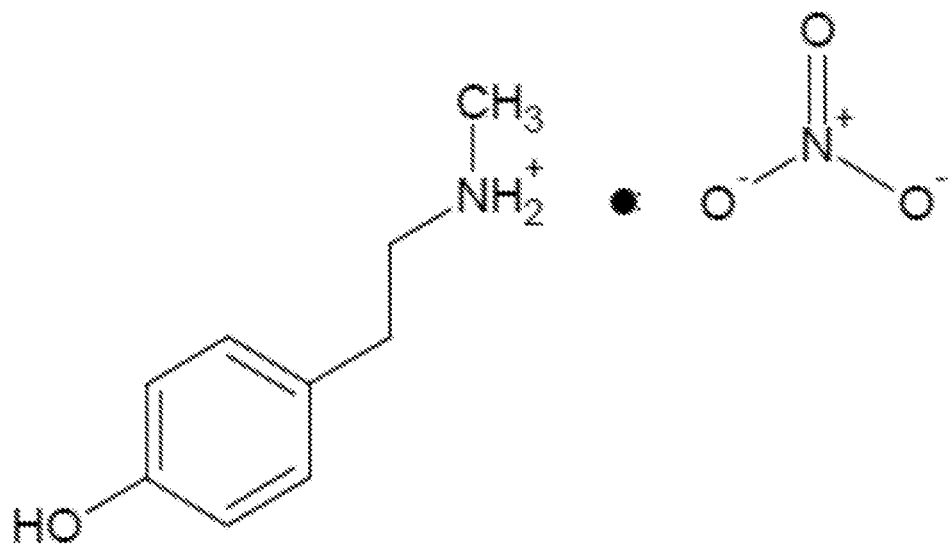
FIG. 4A depicts N-methyl-tyramine nitrate.
Figure 4B:
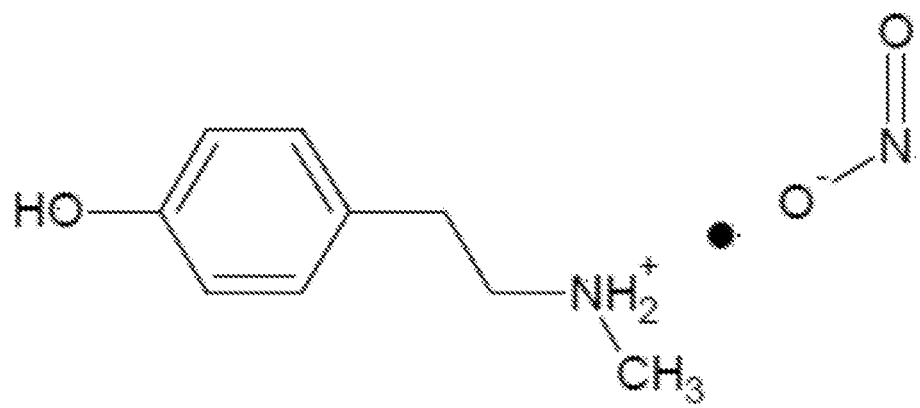
FIG. 4B depicts N-methyl-tyramine nitrite.
Figure 5A:
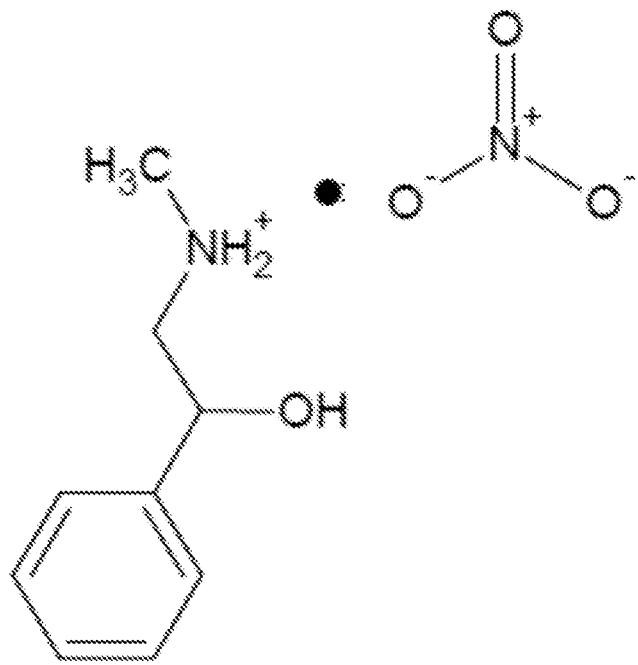
FIG. 5A depicts halostachine nitrate.
Figure 5B:
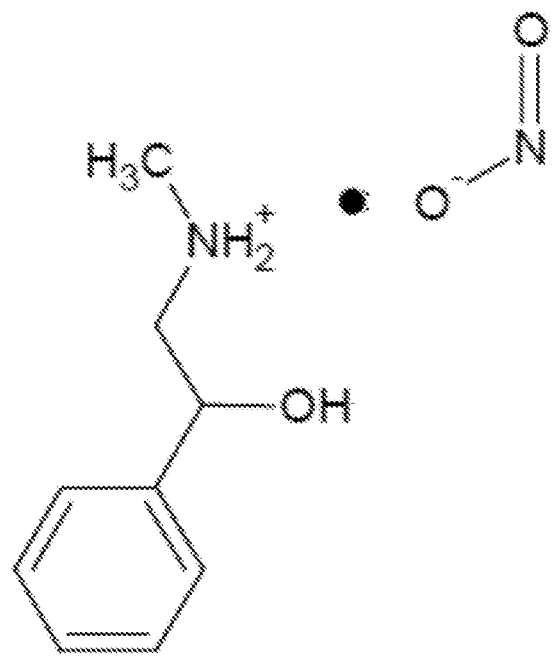
FIG. 5B depicts halostachine nitrite.
Figure 6A:
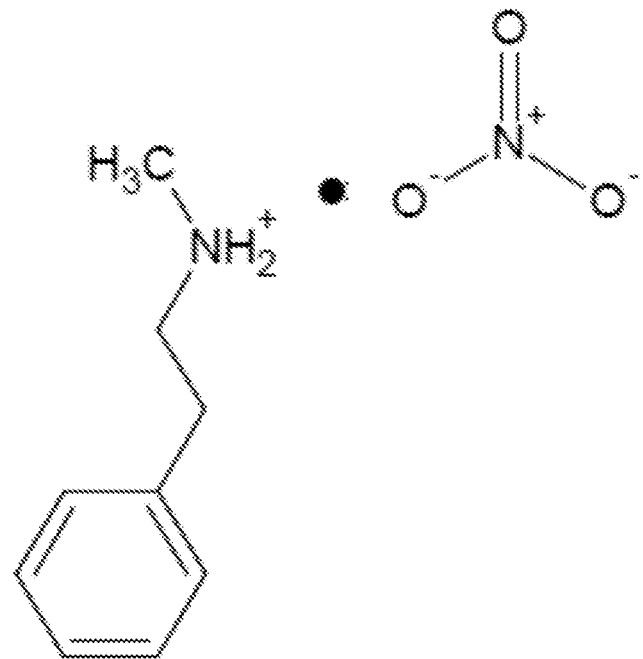
FIG. 6A depicts N-methyl-2-phenylethylamine nitrate.
Figure 6B:
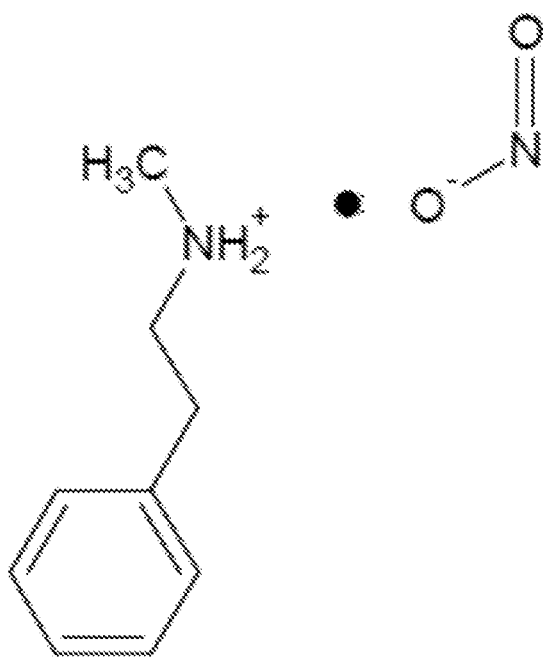
FIG. 6B depicts N-methyl-2-phenylethylamine nitrite.
Figure 7A:
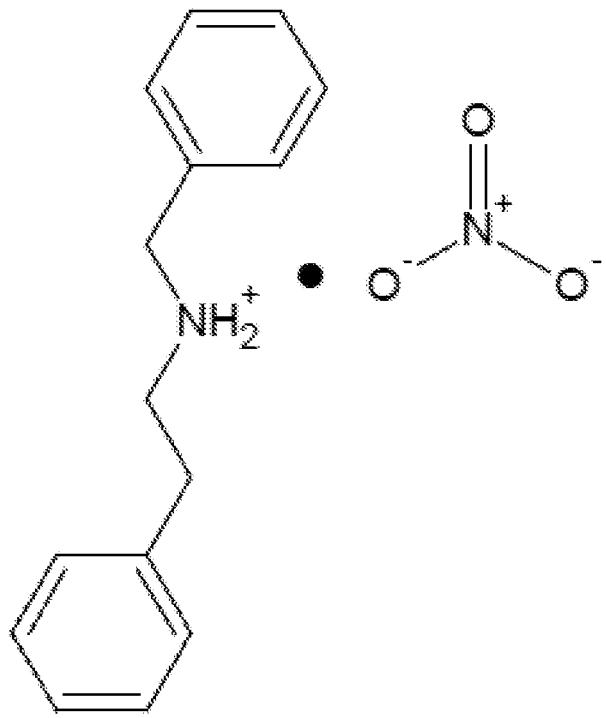
FIG. 7A depicts N-benzyl-2-phenylethylamine nitrate.
Figure 7B:
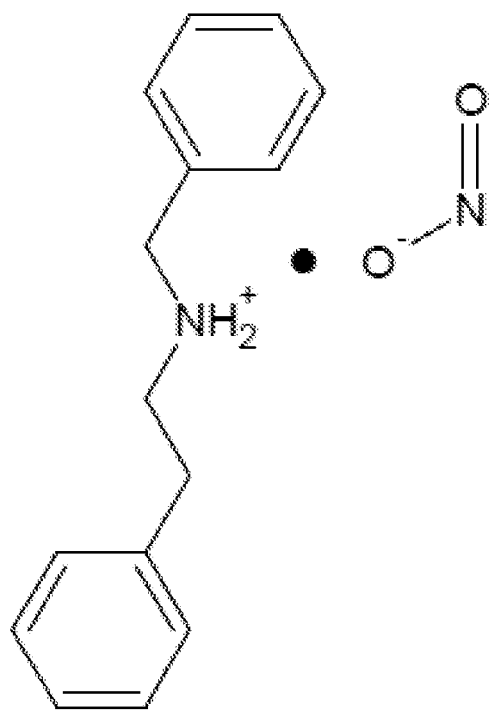
FIG. 7B depicts N-benzyl-2-phenylethylamine nitrite.
Figure 8A:
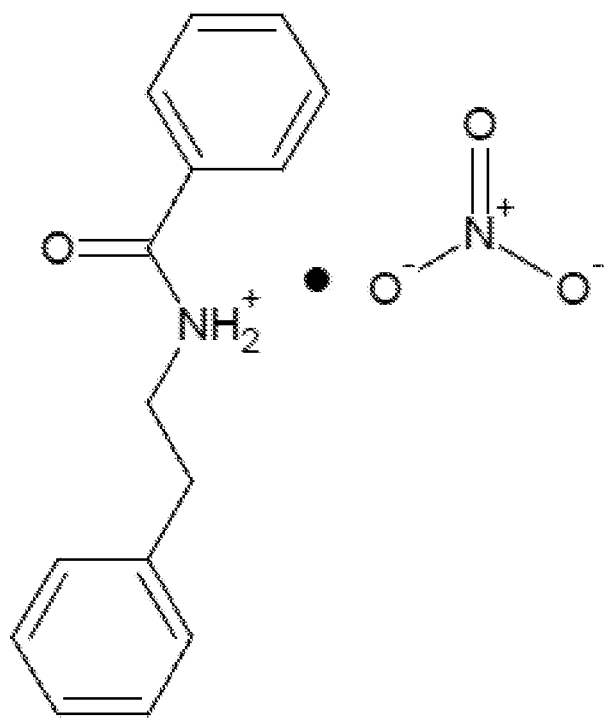
FIG. 8A depicts N-benzoyl-2-phenylethylamine nitrate.
Figure 8B:
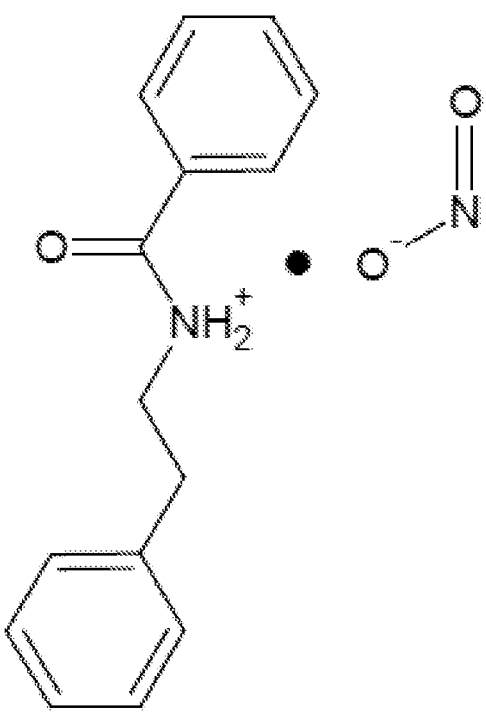
FIG. 8B depicts N-benzoyl-2-phenylethylamine nitrite.

In some implementations, compounds described herein consist of a salt of a PEA and a deprotonated nitric acid. As used herein, a "deprotonated nitric acid" refers to a nitric acid molecule which has lost its one hydrogen atom and has gained an equal amount of negative charge. In some implementations, the salt is 2-phenylethylamine nitrate (FIG. 2A). In other implementations, compounds described herein consist of a salt of a PEA and a deprotonated nitrous acid. As used herein, a "deprotonated nitrous acid" refers to a nitrous acid molecule which has lost its one hydrogen atom and has gained an equal amount of negative charge. In some implementations, the salt is 2-phenylethylamine nitrite (FIG. 2B). As used herein "2-phenylethylamine nitrate" is used interchangeably with "a salt of 2-phenylethylamine and a deprotonated nitric acid" to refer to ionic salts composed of a 2-phenylethylamine cation forming an ionic bond to a deprotonated nitric acid anion.

Also used herein "2-phenylethylamine nitrite" is used interchangeably with "a salt of 2-phenylethylamine and a deprotonated nitrous acid" to refer to ionic salts composed of a 2-phenylethylamine cation forming an ionic bond to a deprotonated nitrous acid anion.

In some implementations, a composition of the present disclosure includes one or more salts consisting of a PEA and a deprotonated nitric acid and/or a composition of the present disclosure includes one or more salts consisting of a PEA and a deprotonated nitrous acid.

During the course of work described herein, it was surprisingly observed that administration of salts of PEA and a deprotonated nitric acid unexpectedly resulted in a substantially faster onset of athletic performance-enhancing effects when compared with an equivalent amount of PEA alone or other salts of PEA. It was surprisingly observed that administration of salts of PEA and a deprotonated nitric acid unexpectedly resulted in a faster onset of increasing athletic performance while substantially increasing and lengthening of duration of athletic performance-enhancing effects when compared with an equivalent amount of PEA alone or other salts of PEA such as the hydrochloride salt.

Additionally, it was also discovered unexpectedly and quite surprisingly that administration of salts of PEA and a deprotonated nitric acid unexpectedly resulted in an enhanced sexual performance in both men and women, including improved and enhanced penile and clitoral erection. As it is well established and known by those skilled in the art and science that the administration of most PEA's actually lead to a significant decrease in sexual performance in men and women due to the peripheral vaso-constrictive effects of most PEA's through peripheral adrenergic activity causing a clinically observable decrease in penile and clitoral erectile genesis and maintainability, this observation is of particular note and interest.

These improvements in athletic and sexual performance observed with a Nitrate or a Nitrite of PEA are unexpectedly and substantially more significant and clinically observable than effects resulting from co-administration of an admixture of a mineral salt of nitric acid (e.g., sodium nitrate or potassium nitrate) and a salt of PEA not containing a Nitrate or a Nitrite (e.g., 2-phenylethylamine hydrochloride) where the admixture and the Nitrate or Nitrite of PEA are standardized with equimolar amounts of PEA and nitric acid/Nitrate/Nitrite. Administration of the admixture results in little or no effect on decreasing the time of onset for clinically observable effects, increasing or lengthening the duration of enhanced athletic performance, and enhancing or improving sexual function.

While not being bound by any particular theory, the inventors believe that Nitrate and Nitrite salts of PEA unexpectedly overcome the current impractical and inconvenient problems well known to be associated with many PEA's by interfering with the various monoamine oxidase enzymes and their ability to de-aminate (i.e., metabolize) the PEA's, thereby allowing for better absorption of the PEA from the alimentary canal as well as a more desirable pharmacokinetic profile via extension of the plasma half-life of the PEA, and/or decreasing the time to maximal plasma concentration of the PEA, and/or increasing the maximal plasma concentration of the PEA thus causing substantial increases in athletic performance when administered orally. However, physiological mechanisms regarding the effects of PEA Nitrate salts and PEA Nitrite salts that are responsible for increasing sexual function are unknown at this time and will require further research.

For example, the athletic performance-enhancing effects of 2-phenylethylamine nitrate can be observed clinically within about 10 minutes of ingestion of a single dose of 0.100 grams to 0.600 grams, inclusive, and are also clinically observable up to six (6) hours later with a single, oral dose as low as 0.200 grams. Notably, daily oral doses of 2-phenylethylamine nitrate as high as 3.00 grams can be tolerated without significant side effects.

The salts of PEA and deprotonated nitric acid and/or salts of PEA and deprotonated nitrous acid may reduce the risk of, prevent the onset of, or ameliorate symptoms associated with athletic performance-hindering conditions such as hypernatremia and/or hyperkalemia, which, when severe, can also be associated with increased morbidity and mortality as well as a decrease in athletic performance.

The salts of PEA and deprotonated nitric acid and/or salts of PEA's and deprotonated nitrous acid to form crystalline powder, which is stable in storage and can be processed without special precautions.

Ingestion of the salts of PEA's and deprotonated nitric acid and/or salts of PEA's and deprotonated nitrous acid may provide a beneficial, physiological vasodilatory effect due to the nitrate and/or nitrite anion content. Salts of PEA's and deprotonated nitric acid and/or salts of PEA's and deprotonated nitrous acid may be administered to subjects (e.g., humans) with or without a high protein diet (about 1.25 to 2.0 grams protein/kilogram of body mass) and proper anaerobic training program in order to increase the variables associated with athletic function for the purpose of enhancing athletic performance. The oral, daily dose of a salt or salts of PEA's and deprotonated nitric acid and/or salts of PEA's and/or deprotonated nitrous acid can be from on about 0.005 grams to about on 3.00 grams per day, and/or from on about 0.025 grams to on about 1.00 grams, and/or more from on about 0.050 to on about 0.600 grams. The oral daily dose may be achieved by single or multiple administrations of a composition or formulation including one or more salts of salts of PEA's and deprotonated nitric acid and/or salts of PEA's and deprotonated nitrous acid. As used herein, the term "about" refers to a +/−10% variation from the nominal value. It is to be understood that such a variation is always included in any given value provided herein, whether or not it is specifically referred to. The composition can be administered before or after athletic activity and before, concurrent with, or after food or beverage intake.

The salts of a PEA Nitrate (e.g., 2-phenylethylamine and a deprotonated nitric acid) and/or a PEA Nitrite (e.g., 2-phenylethylamine and a deprotonated nitrous acid) can be administered before, concurrent with, or after other optional components such as other active ingredients. In some implementations the nutritional supplement composition including a PEA Nitrate salt and/or a PEA Nitrite salt contains one or more of the following ingredients, generally as an active ingredient:

Carbohydrates including, but not limited to, isomaltulose, trehalose, maltodextrin, glucose, sucrose, fructose, lactose, amylose, and/or ribose;

Water soluble vitamins including, but not limited to, Vitamin C, Vitamin B1, Vitamin B2, Vitamin B3, Vitamin B5 (Pantothenic acid), Vitamin B6, Vitamin B12, and/or Vitamin K;

Minerals including, but not limited to, calcium, sodium, potassium, chromium, vanadium, magnesium, and/or iron (and derivatives) (sometimes in amounts less than the RDA);

Nutraceutically acceptable stimulants including, but not limited to, methylxanthines (e.g., caffeine) and/or glucuronolactone (and derivatives);

Nutraceutically acceptable hypoglycemic agents including, but not limited to, alpha-lipoic acid and its derivatives, cinnamon bark, bitter melon extracts, *Gymnema sylvestre* extracts, corosolic acid, pterostilbene and/or D-pinitol (and derivatives);

Creatine, glycocyamine, guanidinopropionic acid, creatinol, and cyclocreatine;

Amino acids, including but not limited to L-Leucine, L-Isoleucine, L-Valine, L-Citrulline, L-Arginine, L-Ornithine, L-Carnitine, L-Tyrosine, L-Aspartic Acid, D-Aspartic Acid, L-Glutamine, PEA Nitrate and/or Nitrite, and/or their derivatives including but not limited to any salt or ester thereof;

Adenosine triphosphates and its disodium salt;

Glycerol and glycerol monostearate;

Mannitol;

Sorbitol; and

Dextrin.

The composition or formulation may include from about 0.5% to about 100% (by weight) of a PEA Nitrate salt and/or a PEA Nitrite salt, from about 5% to about 100% a PEA Nitrate salt and/or a PEA Nitrite salt, or from about 50% to about 100% a PEA Nitrate salt and/or a PEA Nitrite salt.

As used herein, the terms "nutraceutical" and "nutraceutically acceptable" are used herein to refer to any substance that is a food or part of a food and provides medical or health benefits, including the prevention and treatment of disease. Hence, compositions falling under the label "nutraceutical" or "nutraceutically acceptable" may range from isolated nutrients, nutritional or dietary supplements, and specific diets to genetically engineered designer foods, herbal products, and processed foods such as cereals, soups, and beverages. In a more technical sense, the term has been used to refer to a product isolated or purified from foods, and generally sold in medicinal forms not usually associated with foods and demonstrated to have a physiological benefit or provide protection against chronic disease.

As used herein, the term "derivative" can include salts, esters, ethers, amides, azines, imidines, chelates, lactone forms, hydrates, alkylations (e.g., a mono-methylated or poly-methylated variant of the moiety) or complexes of stated chemicals. Such derivatives can also include stereoisomers or structural isomers, so long as the derivative operates similarly and produces the desired effect. Alternatively, the derivative can be a precursor to the stated chemical, which subsequently undergoes a reaction in vivo to yield the stated chemical or derivative thereof. By way of non-limiting example only, ubiquinol is a useful derivative of ubiquinone, and acetyl-L-carnitine is a useful derivative of L-carnitine, ketoisocaproic acid is a useful derivative of L-leucine, and R-dihydrolipoic acid is a useful derivative of R-α-lipoic acid.

The compositions and formulations of the disclosure may contain pharmaceutically, e.g., nutraceutically, acceptable excipients, according to methods and procedures well known in the art. As used herein, "excipient" refers to substances which are typically of little or no therapeutic value, but are useful in the manufacture and compounding of various pharmaceutical preparations and which generally form the medium of the composition. These substances include, but are not limited to, coloring, flavoring, and diluting agents; emulsifying, dispersing and suspending agents, ointments, bases, pharmaceutical solvents; antioxidants and preservatives; and miscellaneous agents. Suitable excipients are described, for example, in Remington's Pharmaceutical Sciences, which is incorporated herein by reference in its entirety. As used herein, "pharmaceutically acceptable excipient" refers to substances added to produce quality tablets, capsules, granulates, or powders, but which do not provide nutritive value. An exemplary (non-exhaustive) list of such excipients includes monoglycerides, magnesium stearate, modified food starch, gelatin, microcryatalline cellulose, glycerin, stearic acid, silica, yellow beeswax, lecithin, hydroxypropylcellulose, croscarmellose sodium, and crosprovidone.

The compositions and formulations according to the present disclosure can further include one or more acceptable carriers. A wide number of acceptable carriers are known in the nutritional supplement arts, and the carrier can be any suitable carrier. The carrier need only be suitable for administration to animals, including humans, and be able to act as a carrier without substantially affecting the desired activity of the composition. Also, the carrier(s) may be selected based upon the desired administration route and dosage form of the composition. For example, the nutritional supplement compositions according to the present disclosure are suitable for use in a variety of dosage forms, such as liquid form and solid form (e.g., a chewable bar or wafer). In desirable implementations, as discussed below, the nutritional supplement compositions include a solid dosage form, such as a tablet or capsule. The tablet forms can include uncoated tablets, single-layer, multi-layer or encased forms, enteric coated tablets or effervescent tablets. Examples of suitable carriers for use in tablet and capsule compositions include, but are not limited to, organic and inorganic inert carrier materials such as gelatin, starch, magnesium stearate, talc, gums, silicon dioxide, stearic acid, cellulose, and the like. Desirably, the carrier is substantially inert, but it should be noted that the nutritional supplement compositions of the present disclosure may contain further active ingredients in addition to a PEA Nitrate and/or PEA Nitrite. In certain aspects the composition or formulation including a salt of a PEA and a deprotonated inorganic acid is DSHEA-compliant (i.e., complies with the Dietary Supplement Health and Education Act of 1994).

Salts of a PEA and a deprotonated nitric acid and/or salts of a PEA and a deprotonated nitrous acid can be made by any suitable method. Exemplary (non-limiting) implementations of methods of making a PEA and a deprotonated nitric acid and/or salt of a PEA and a deprotonated nitrous acid is described in the Examples below.

One method of preparation of a salt of PEA and a deprotonated nitric acid is via reacting equimolar amounts of 2-phenylethylamine and nitric acid in aqueous solution, at temperatures ranging from room temperature to 50° C., and allowing the solution to slowly cool or evaporate and crystals of 2-phenylethylamine nitrate to form. A particularly cost-effective method of synthesizing the inorganic acid salts of a PEA of the present disclosure involves combining equimolar amounts of an inorganic acid and 2-phenylethylamine solvated into a volume of distilled and deionized water, sufficient to insure complete solvation of the inorganic acid and 2-phenylethylamine, and waiting for crystallization of the salt to occur.

Advantageously, the PEA Nitrate and/or a PEA Nitrite salts of the present disclosure can be used as a composition, either alone or as part of a more complex composition containing any number of additional ingredients.

In some implementations, the compositions and dietary supplements include a Nitrate and/or a Nitrite of a Phenylethylamine. By way of example, Phenylethylamines include 2-phenylethylamine (or benzeneethanamine having a CAS No. of 64-04-0); hordenine (or 4-(2-dimethylaminoethyl)phenol having a CAS No. of 539-15-1); halostachine (or (R)-alpha-((methylamino)methyl)-benzenemethanol having a CAS No. of 495-42-1); synephrine (or 4-hydroxy-alpha-((methylamino)methyl)benzenemethanol having a CAS No. of 94-07-5); N-methyl-tyramine (or 4-hydroxy-N-methylphenethylamine having a CAS No. of 370-98-9); N-methyl-2-phenylethylamine (or N-methyl-benzeneethanamine, having a CAS No. of 589-08-2); 2-methyl-phenylethylamine (or beta-methyl-benzeneethanamine, having a CAS No. of 582-22-9); tyramine (or 2-(4-Hydroxyphenyl) ethylamine having a CAS No. of 51-67-2); N-benzyl-2-phenylethylamine (CAS No. 3647-71-0); N-benzoyl-2-hydroxy-2-phenylethylamine (CAS No. 111059-46-2); N-benzoyl-2-phenylethylamine (CAS No. 3278-14-6); octopamine (or alpha-(aminomethyl)-4-hydroxy-benzenemethanol, having a CAS no. 104-14-3); synephrine (or 4-Hydroxy-alpha-((methylamino)methyl)benzenemethanol having a CAS No. of 94-07-5); methylsynephrine (or 1-(4-Hydroxyphenyl)-2-methylaminopropanol having a CAS No. of 365-26-4); epinephrine (or 1-1-(3,4-Dihydroxyphenyl)-2-methylaminoethanol having a CAS No. of 51-43-4); dopamine (or 3,4-Dihydroxyphenylethylamine having a CAS No. of 51-61-6); norepinephrine (or (R)-4-(2-Amino-1-hydroxyethyl)-1,2-benzenediol having a CAS No. of 51-41-2); phenylephrine (having a CAS No. of 59-42-7); ethylamphetamine (or N-ethyl-1-phenyl-propan-2-amine having a CAS No. of 457-87-4); phentermine (or 2-methyl-1-phenylpropan-2-amine having a CAS No. of 122-09-8); and amiflamine (or 4-[(2S)-2-aminopropyl]-N,N,3-trimethylaniline having a CAS No. of 77518-07-1).

In some implementations, the Phenylethylamine is a selective serotonin re-uptake inhibitor (SSRI). Additional non-limiting examples of Phenylethylamines include fluoxetine, venlafaxine, sertraline, ephedrine, methylphenidate, phenmetrazine, bupropion, and selegiline.

Phenethylamine may be inactivated due to rapid metabolism by monoamine oxidase (MAO) into phenylacetic acid. This metabolism may prevent significant concentrations from reaching the targeted tissues. In some implementations, the phenylethylamine is combined with a monoamine oxidase inhibitor (MAOI), which prevents metabolism of the phenylethylamine. Examples of MAOIs that may be used include phenelzine, tranylcypromine, isocarboxasid, and selegiline (Eldepryl or Deprenyl).

The compositions and dietary supplements may be administered in any form common in the art. For example, the compositions and supplements may be administered in the form of a powder to be mixed in liquid (e.g., a solution or suspension) or in a solid dosage form such as a tablet, pill, capsule or caplet, gel, bar, colloid or pudding. Additionally, a PEA Nitrate salt and/or a PEA Nitrite salts may be suspended or dissolved in any pharmaceutically acceptable carrier or vehicle medium for injection. As such, it may be combined with any number of commonly accepted excipients, as is regularly practiced in the art.

The compounds, compositions, formulations and methods of the present disclosure may provide significant increase or improvement in athletic performance, e.g., muscle size, and/or muscle strength, and/or muscle endurance in individuals. As used herein, "athletic performance" refers to one or more physical attributes which can be dependent to any degree on skeletal muscle contraction. For example, athletic performance includes, but is not limited to, maximal muscle power, muscular endurance, running speed and endurance, swimming speed and endurance, throwing power, lifting and pulling power. Athletic performance consists of strong, precise, controlled movements that can be maintained over the time desired by a subject to achieve a particular result of strength, speed, power and/or precision.

While it is expected that the compositions and methods of the present disclosure will be of particular importance to bodybuilders and other athletes, the usefulness of compositions and methods of the disclosure is not limited to those groups. Rather, any individual may beneficially use the compositions and methods of the disclosure. Indeed, the disclosed compositions and methods have application to all animals, including mammals, birds and reptiles. As used herein, the term "animal" includes all members of the animal kingdom, preferably mammals (e.g., dogs, horses, cows, mules), more preferably humans. For example, the nutritional supplements of the disclosure may have beneficial effect for competitive animals (e.g., racehorses, show horses, racing dogs (e.g., greyhounds), bird dogs, show dogs) and work animals (e.g., horses, mules and the like) in whom an increase in muscle performance is desirable.

The compounds, compositions and formulations according to the present disclosure may be employed in methods for supplementing the diet of an individual, e.g., an athlete, and/or for enhancing an individual's muscle mass and/or muscle size and/or strength, and/or endurance and/or for fat loss. Accordingly, the present disclosure provides methods of supplementing the dietary intake of an individual including administering to the individual an effective amount of a composition (e.g., a PEA Nitrate salt and/or a PEA Nitrite salt, e.g., a salt of a PEA and a deprotonated nitric acid acid and/or a salt of a PEA and a deprotonated nitrous acid, and a nutritional supplement including the same) according to the present disclosure to increase athletic performance or athletic function in said individual. The disclosure also relates to methods of improving athletic performance and/or athletic function in an individual including administering an effective amount of a salt of a PEA Nitrate and/or a PEA Nitrite and a deprotonated (alone or in combination with other agents, e.g., in a nutritional supplement) to the individual.

As used herein, an "effective amount" or an "amount effective for" is defined as an amount effective, at dosages and for periods of time necessary, to achieve a desired biological result, such as reducing, preventing, or treating a disease or condition and/or inducing a particular beneficial effect. The effective amount of compositions of the disclosure may vary according to factors such as age, sex, and weight of the individual. Dosage regime may be adjusted to provide the optimum response. Several divided doses may be administered daily, or the dose may be proportionally reduced as indicated by the exigencies of an individual's situation. As will be readily appreciated, a composition in accordance with the present disclosure may be administered in a single serving or in multiple servings spaced throughout the day. As will be understood by those skilled in the art, servings need not be limited to daily administration, and may be on an every second or third day or other convenient effective basis. The administration on a given day may be in a single serving or in multiple servings spaced throughout the day depending on the exigencies of the situation.

The term "fatigue" as used herein refers to the inability to maintain a consistent level of peak athletic performance for a desired period of time. Fatigue is here defined to be due to the exhaustion of energy sources to metabolize, buildup of toxic metabolites in muscle, and the like but not due to lack of sleep, metabolic disease or illness.

In some implementations, the composition is a nutritional supplement including an ionic salt of a PEA Nitrate and/or a PEA Nitrate in an amount of from on about 0.005 g to on about 3.00 g, inclusive. In other aspects the composition is a nutritional supplement including the ionic salt of a PEA Nitrate and/or a PEA Nitrate in an amount of from on about 0.5% to on about 100%, inclusive. In certain implementations, the composition includes additional active ingredients and/or is formulated for oral use.

The disclosure also relates to a method of increasing athletic performance in an animal including administering to the animal a composition including an ionic salt of a PEA Nitrate and/or a PEA Nitrite. In certain aspects, the composition is a nutritional supplement including an ionic salt of a PEA Nitrate and/or a PEA Nitrite in an amount of from about 0.005 g to about 3.00 g, inclusive.

Phenylethylamine (PEA) may be provided within a range of on about 0.005 g/day to on about 3.00 g/day. PEA is naturally occurring monoamine alkaloid. It is biosynthesized from the amino acid phenylalanine by enzymatic decarboxylation. Besides mammals, PEA is found in many other organisms and foods such as chocolate, especially after microbial fermentation. It is sold as a dietary supplement for mood and weight loss-related therapeutic benefits; however, orally ingested PEA may be inactivated on account of extensive first-pass metabolism by monoamine oxidase (MAO) into phenylacetic acid, preventing significant concentrations from reaching the brain. PEA, similarly to amphetamine, acts as a releasing agent of norepinephrine and dopamine in the neuronal cleft between neurons. Without wishing to be bound to any theory, the PEA Nitrates and Nitrites of the present disclosure may exhibit superior properties because of their ability to avoid or delay this rapid metabolic inactivation.

Dietary

Dietary supplements formulated for the sustained release of PEA Nitrate and/or Nitrite are provided. The dietary supplements may include a food product or a liquid product.

Solid Food Products

A dietary supplement formulated as a food product can be in a solid or an edible suspension. Solid food products may include chewable or edible bars, cookies, biscuits, lozenges, chewing gum, or edible suspension. In one implementation, the dietary supplement containing PEA Nitrate and/or Nitrite is a solid food product in the form of a high-energy multi-saccharide edible bar containing the substance galactose.

In one implementation, an edible food bar includes a saccharide component including 3 to 37% weight/weight (w/w) galactose, 0.1 to 75% w/w PEA Nitrate and/or Nitrite, and optional further ingredients selected from amino acids, carbohydrates, fiber and fat, and other ingredients such as creatine and beta-alanylhistidine peptides (e.g. carnosine, anserine, and/or balenine). The amount of galactose can be, for example, 5 to 20% w/w (e.g., 5 to 15% w/w). The saccharide component also can include glucose. In one implementation, equal amounts of glucose and galactose are provided. In another implementation, the amount of galactose is greater than the amount of glucose.

Generally PEA Nitrate and/or Nitrite may be included with other ingredients to give a bar, drink or other type of food that can be low in glucose and can have a low glycemic index. The use of galactose affords several advantages. For example, galactose is not insulogenic; that is, galactose does not itself induce an insulin response. Thus, its use is associated with less of an insulin response than the equivalent mass of glucose. Products may be used by diabetics or persons who are intolerant to lactose. Galactose can be used rapidly by the liver for synthesis of glycogen or glucose, and it is less likely to cause dental erosion than other sugars.

Some implementations of solid food product compositions containing PEA Nitrate and/or Nitrite incorporate 0.1 to 50% PEA Nitrate and/or Nitrite. In order to prevent unwanted adverse side effects, it is desired that the PEA Nitrate and/or Nitrite exhibits sustained or delayed release from the food product. For example, the PEA Nitrate and/or Nitrite thereof may be contained within a food product and separated from any moist ingredients by, for example, formulation in layers. Alternatively, the PEA Nitrate and/or Nitrite thereof may be embodied within the matrix of the food itself, wherein the nature of the matrix delays dissolution of the food within the stomach. Additionally, PEA Nitrate and/or Nitrite can be encapsulated as granules or powder in a dry water-impervious shell (e.g., micro-encapsulation) and used in a food product. In this way, the PEA Nitrate and/or Nitrite can be slowly released in the stomach by dissolution.

Use of fiber in a food product (e.g., an energy bar) is advantageous because different fiber products influence the release of sugars, affect the binding of various components and advantageously delay digestion. An amount of between 0 to 5% (or more) w/w sugars may be used in a food product containing PEA Nitrate and/or Nitrite. Furthermore, a composition containing PEA Nitrate and/or Nitrite may be absorbed onto the fiber prior to the manufacture of the food product. In this way, the absorption of the PEA Nitrate and/or Nitrite into the body may be retarded.

In a layered arrangement, the PEA Nitrate and/or Nitrite powder or aggregate may be covered with a hard dry sugar layer. Alternatively or in addition, a chocolate containing layer may be used as a moisture barrier. A PEA Nitrate and/or Nitrite containing layer may be provided as a laminar cylindrical layer disposed within the bar as the inner layer. Alternatively or in addition, ingredients such as fiber, nuts and dried fruit may be layered onto the layer-containing PEA Nitrate and/or Nitrite to form a laminate. Such a layer may incorporate syrup so as to form a composite-type layer.

In alternative food products, PEA Nitrate and/or Nitrite powder or aggregate may be covered with a hard sugar mixture, chocolate or both to form particles with a mass of 100 to 500 mg. These can be combined with the remaining ingredients to form dispersed units within the matrix, for example, as chocolate chips within a cookie. Such an encapsulated arrangement may incorporate layers as previously described.

Edible Suspensions

In another implementation, dietary supplements containing PEA Nitrate and/or Nitrite are food products wherein the PEA Nitrate and/or Nitrite is suspended in an edible supporting matrix to form an edible suspension. The term "suspension" is intended to mean compositions containing PEA Nitrate and/or Nitrite as provided herein, include PEA Nitrate and/or Nitrite in solid form (e.g. as crystals, powder or the like), distributed within an edible viscous liquid or semi-liquid, or a solid, supporting matrix, typically such that settling (under the influence of gravity) of the solid PEA Nitrate and/or Nitrite is inhibited or prevented.

The composition may be provided in solid, liquid or semi-liquid form (e.g. as a drink, soup or yogurt). The PEA Nitrate and/or Nitrite may be distributed substantially evenly throughout the supporting matrix (by homogenizing in some manner e.g. by stirring, blending or the like), which may be accomplished manually (e.g. by the consumer) and/or mechanically at the time the composition is prepared.

Conveniently, the food product is an otherwise conventional food product supplemented with PEA Nitrate and/or Nitrite such that PEA Nitrate and/or Nitrite becomes suspended in the foodstuff. Examples of foodstuffs that may represent suitable supporting matrices for the composition of the disclosure include spreadable solids such as dairy or cheese spreads, margarines, meat and fish pastes and spreads and the like. Other convenient supporting matrices are those containing sugars or other carbohydrates, such as liquid ("runny") or solid ("set") honey, molasses, syrup (e.g. corn syrup, glucose syrup), treacle or gels of any description, foods made viscous by cooling including ice-cream, and foods made viscous by cooking and baking, e.g. muffins, pies, tarts, cakes, biscuits and cereal flakes.

If desired, the viscosity of the edible matrix and/or the composition as a whole, may be increased by the addition of viscosifiers, gelling agents and the like. Such components are well-known in the food industry and include, for example, plant-derived polysaccharides, gums and the like such as galactomannans, dextrans, guar gum, locust bean gum and so on. Such viscosifiers, gels and the like may form the supporting matrix, if desired. One representative edible matrix includes a gel prepared from concentrated Aloe Vera extract: a smooth creamy paste, which, for example, can be packaged in a squeezable tube.

The composition may include one or more further components to improve its palatability, stability, flavor or nutritive quality. These further components may include electrolytes, vitamins (e.g., vitamin E, vitamin C, thiamin, riboflavin, niacin, vitamin B6, folic acid, vitamin B12, biotin, and pantothenic acid), lipids, carbohydrates (e.g., starch and/or sugars, e.g., glucose, fructose, sucrose, and maltrose), amino acids, trace elements, colorings, flavors, artificial sweeteners, natural health improving substances, anti-oxidants, stabilizers, preservatives, and buffers. The composition may be unflavored or have the normal flavor of the matrix. Alternatively, one or more flavors may be added (e.g. fruit, cheese or fish flavor).

Other ingredients that can be included in the presently disclosed sustained release PEA Nitrate and/or Nitrite compositions can include, for example, anti-oxidants, alpha-lipoic acid, tocotrienols, N-acetylcysteine, Co-enzyme Q-10, extracts of rosemary such as carnosol, botanical anti-oxidants such as green tea polyphenols, grape seed extract, COX-1 type inhibitors such as resveratrol, *ginkgo biloba*, and garlic extracts. Other amino acids such as L-cysteine or L-citrulline may be added. Combination with an acetylcholine precurser such as choline chloride or phosphatidylcholine may be desirable, for example, to enhance vasodilation. It is to be understood that such combination therapy constitutes a further aspect of the compositions and methods of treatment provided herein.

Artificial sweeteners which can be used include Aspartame, Acesulfam K, Saccharin and Cyclamate. Almost any desired flavoring can be added such as fruity flavors such as berry, lemon, orange, *papaya* and grapefruit. Citric acid may be used as an acidulant and citrate (e.g. sodium citrate) as a buffering agent. Also, other natural health improving substances such as Pan D'Arco tea, *Ginseng*, Suma tea, *Ginkgo*, bee pollen and myrrh may be added in physiologically active amounts. Preservatives such as potassium benzoate and/or potassium sorbate can be included. Coloring can be included such as cold water soluble colorant such as beta-carotene. Other suitable colorings, however, will be apparent to those skilled in the art. A clouding agent may be included in the composition, if desired, to improve the appearance of the composition.

Mineral and trace elements also can be added in any type or form which is suitable for human consumption. It is convenient to provide the calcium and potassium in the form of their gluconates, phosphates or hydrogen phosphates, and magnesium as the oxide or carbonate, chromium as chromium picolinate, selenium as sodium selenite or selenate, and zinc as zinc gluconate.

Pharmaceutical Compositions

Pharmaceutical compositions can be prepared in individual dosage forms. Consequently, pharmaceutical compositions and dosage forms may include the active ingredients disclosed herein. The notation of "the pharmaceutical agent" signifies the compounds described herein or salts thereof. Pharmaceutical compositions and dosage forms can further include a pharmaceutically acceptable carrier. In one implementation, the term "pharmaceutically acceptable" means approved by a regulatory agency of the Federal or a state government or listed in the U.S. Pharmacopeia or other generally recognized pharmacopeia for use in animals, and more particularly in humans. The term "carrier" refers to a diluent, adjuvant, excipient, or vehicle with which an active ingredient is administered. Such pharmaceutical carriers can be liquids, such as water and oils, including those of petroleum, animal, vegetable or synthetic origin, such as peanut oil, soybean oil, mineral oil, sesame oil and the like. The pharmaceutical carriers can be saline, gum acacia, gelatin, starch paste, talc, keratin, colloidal silica, urea, and the like. In addition, other excipients can be used.

Single unit dosage forms are suitable for oral, mucosal (e.g., nasal, sublingual, vaginal, buccal, or rectal), parenteral (e.g., subcutaneous, intravenous, bolus injection, intramuscular, or intraarterial), or transdermal administration to a patient. Examples of dosage forms include, but are not limited to: tablets; caplets; capsules, such as soft elastic gelatin capsules; cachets; troches; lozenges; dispersions; suppositories; ointments; cataplasms (poultices); pastes; powders; dressings; creams; plasters; solutions; patches; aerosols (e.g., nasal sprays or inhalers); gels; liquid dosage forms suitable for oral or mucosal administration to a patient, including suspensions (e.g., aqueous or non-aqueous liquid suspensions, oil-in-water emulsions, or a water-in-oil liquid emulsions), solutions, and elixirs; liquid dosage forms suitable for parenteral administration to a patient; and sterile solids (e.g., crystalline or amorphous solids) that can be reconstituted to provide liquid dosage forms suitable for parenteral administration to a patient. The agent may be administered via a parenteral or oral route, but other routes are contemplated.

The composition, shape, and type of dosage forms will typically vary depending on their route of administration and animal being treated. For example, a parenteral dosage form may contain smaller amounts of one or more of the active ingredients it includes than an oral dosage form used to treat the same disease. These and other ways in which specific dosage forms encompassed by this disclosure will vary from one another will be readily apparent to those skilled in the art. See, e.g., Remington's Pharmaceutical Sciences, 18th ed., Mack Publishing, Easton Pa. (1990) which is incorporated by reference in its entirety.

Typical pharmaceutical compositions and dosage forms include one or more excipients. Suitable excipients are well known to those skilled in the art of pharmacy, and non-limiting examples of suitable excipients are provided herein. Whether a particular excipient is suitable for incorporation into a pharmaceutical composition or dosage form depends on a variety of factors well known in the art including, but not limited to, the way in which the dosage form will be administered to a patient. For example, oral dosage forms such as tablets may contain excipients not suited for use in parenteral dosage forms. The suitability of a particular excipient may also depend on the specific active ingredients in the dosage form. For example, the decomposition of some active ingredients may be accelerated by some excipients such as lactose, or when exposed to water.

The disclosure further encompasses pharmaceutical compositions and dosage forms that include one or more compounds that reduce the rate by which an active ingredient will decompose. Such compounds, which are referred to herein as "stabilizers," include, but are not limited to, antioxidants such as ascorbic acid, pH buffers, or salt buffers.

The implementations set forth in the present application are provided only to illustrate various aspects of the disclosure, and additional implementations and advantages of the compositions and methods of the present disclosure will be apparent to those skilled in the art. The teachings of all references cited herein are incorporated herein by reference. The disclosure will be further exemplified by the following non-limiting examples.

EXAMPLES

Example 1

Synthesis of 2-Phenylethylamine Nitrate

Procedure:

Step 1. About 121.00 grams of 2-phenylethylamine (USP23 grade of 99.9% purity) was dissolved into about 1.00 liter of distilled/deionized water in a large glass flask or beaker at a temperature range between about 18° C. and 80° C. The solution thus formed is referred to as the 2-PEA/water solution.

Step 2. About 63.00 grams of nitric acid was dissolved into the 2-PEA/water solution produced in step 1 to produce a 2-PEA/water/nitric acid solution.

Step 3. The 2-PEA/water/nitric acid solution was left alone for a period of between about four to about twenty four hours during which a crystalline precipitate of a salt of 2-phenylethylamine and deprotonated nitric acid (2-phenylethylamine nitrate) formed.

Step 4. The precipitate of step 3 was removed by filtration to yield between 100.00 to 184.00 grams of 2-phenylethylamine nitrate.

Example 2

Synthesis of 2-Phenylethylamine Nitrite

Procedure:

Step 1. About 121.00 grams of 2-phenylethylamine (USP23 grade of 99.9% purity) is dissolved into about 1.00 liter of distilled/deionized water in a large glass flask or beaker at a temperature range between about 18° C. and 80° C. The solution thus formed is referred to as the 2-PEA/water solution.

Step 2. About 47.00 grams of nitrous acid is dissolved into the 2-PEA/water solution produced in step 1 to produce a 2-PEA/water/nitrous acid solution.

Step 3. The 2-PEA/water/nitrous acid solution is left alone for a period of between about four to about twenty four hours during which a crystalline precipitate of a salt of 2-phenylethylamine and deprotonated nitrous acid (2-phenylethylamine nitrite) forms.

Step 4. The precipitate of step 3 is removed by filtration to yield between 100.00 to 158.00 grams of 2-phenylethylamine nitrite.

Example 3

Effects of 2-Phenylethylamine Nitrate vs. 2-Phenylethylamine HCl+NaNO$_3$ vs. Placebo on Athletic Performance Solid dose capsules (size "00", gelatin) were prepared containing either 600 mg of 2-phenylethylamine nitrate or equimolar quantities of an admixture of 2-phenylethylamine HCl and sodium nitrate (NaNO$_3$). A placebo filled with an inert substance (200 mesh guar gum) was also prepared. The subject was given a single capsule containing 2-phenylethylamine nitrate, an admixture of 2-phenylethylamine HCl and NaNO$_3$, or the placebo.

After oral administration of the compound, the subject's ability to maintain a speed of about 5.5 mph on an elliptical trainer was measured. The length of time was recorded before the subject became fatigued and was no longer able to maintain this pace (see Table 1). Athletic performance was measured at times soon after administration of the compound before the subject had engaged in significant physical activity that day (at about 9:30 am each day). The subject was blinded to the identity of the capsules. Measurements were taken on several occasions, and the average values are presented in Table 1.

TABLE 1

Length of Time that the Subject Maintained a 5.5 mph Pace on an Elliptical after Administration of 600 mg of 2-Phenylethylamine Nitrate, Equimolar Amounts of an Admixture of 2-Phenylethylamine HCl and NaNO$_3$ (2-Phenylethylamine HCl + NaNO$_3$), or Placebo.

| Treatment | Time (Minutes) | Percent Improvement Compared to Placebo |
| --- | --- | --- |
| None (Control) | 60 | — |
| 2-Phenylethylamine HCl + NaNO$_3$ | 62 | 3% |
| 2-Phenylethylamine Nitrate | 66 | 10% |

The subject estimated that the effect of the 2-phenylethylamine nitrate lasted substantially longer than the effect of the admixture. For example, the 2-phenylethylamine nitrate produced a sense of euphoria that typically lasted 50% longer than that experienced with the admixture. Moreover, the subject reported that the vasodilation resulting from the 2-phenylethylamine nitrate lasted at least twice as long as that experienced with the admixture as measured by a drop in systolic blood pressure measured with a digital, piezoelectric sphygmomanometer.

Example 4

Effects of 2-Phenylethylamine Nitrate vs. 2-Phenylethylamine HCl+NaNO$_3$ vs. Placebo on Sexual Performance Solid dose capsules were prepared as described in Example 3. The subject was given a single capsule containing 2-phenylethylamine nitrate, an admixture of 2-phenylethylamine HCl and NaNO$_3$, or a placebo.

Sexual performance was evaluated in the male subject by the relative length of time and number of times he was able to maintain an erection and engage in sexual intercourse (i.e., penile erectile genesis and maintainability) with his partner during a given period.

The subject reported a surprising enhancement in his sexual performance after administration of the 2-phenylethylamine nitrate that was superior over that observed when the admixture or placebo was administered. The subject noted that the refractory time between erections was significantly reduced by almost 35% with 2-phenylethyamine nitrate whereas no change in the refractory time was observed with either the admixture or placebo.

Unless defined otherwise, all technical and scientific terms herein have the same meaning as commonly understood by one of ordinary skill in the art. Although any methods and materials, similar or equivalent to those described herein, can be used in practice or testing, the methods and materials are described herein. All references, publications, patents, and patent publications cited or listed are incorporated by reference herein in their entirety for all purposes.

The publications discussed herein are provided solely for their disclosure prior to the filing date of the present application. Nothing herein is to be construed as an admission that the present disclosure is not entitled to antedate such publication by virtue of prior invention.

It is understood that this disclosure is not limited to the particular methodology, protocols and materials described as these can vary. It is also understood that the terminology used herein is for the purposes of describing particular implementations only and is not intended to limit the scope of this disclosure which will be limited only by the appended claims.

Those skilled in the art will recognize, or be able to ascertain using no more than routine experimentation, many equivalents to the specific implementations described herein. Such equivalents are intended to be encompassed by the following claims.

The following references, to the extent that they provide exemplary procedural or other details supplementary to those set forth herein, are specifically incorporated herein by reference.

REFERENCES

Bailey B A, Phillips S R, Boulton A A, In vivo release of endogenous dopamine, 5-hydroxytryptamine and some of their metabolites from rat caudate nucleus by phenylethylamine. Neurochem Res. 1987, 12: 173-178.

Baker G B, Bornstein R A, Rouget A C, et al. Phenylethylaminergic mechanisms in attention-deficit disorder. Biol Psychiatry 1991; 29:15-22.

Bakhle Y S, and Youdim M B. Metabolism of phenylethylamine in rat isolated perfused lung: evidence for monoamine oxidase 'type B' in lung. Br J Pharmacol. 1976, 56(1): 125-127.

Birkmayer W, Riederer P, Linauer W, Knoll J. L-deprenyl plus Lphenylalanine in the treatment of depression. J Neural Transm 1984; 59: 81-7.

Blenau W, Balfanz S, Baumann A. Amtyr1: characterization of a gene from honeybee (*Apis mellifera*) brain encoding a functional tyramine receptor. J Neurochem 2000; 74: 900-8.

Borison R L, Mosnaim A D, Sabelli H C. Brain 2-phenylethylamine as a major mediator for the central actions of amphetamine and methylphenidate. Life Sci 1975; 17: 1331-43.

Borison R L, Mosnaim A D, Sabelli H C. Brain 2-phenylethylamine as a major mediator for the central actions of amphetamine and methylphenidate. Life Sci 1975; 17: 1331-4.

Branchek T A, Blackburn T P. Trace amine receptors as targets for novel therapeutics: legend, myth and fact. Curr Opin Pharmacol 2003; 3: 90-97.

Camp B J. Action of N-methyltyramine and N-methyl beta-phenylethylamine on certain biological systems. Am J Vet Res. 1970, 31(4): 755-762.

Comings D E, Ferry L, Bradshaw-Robinson S, et al. The dopamine D2 receptor (DRD2) gene: a genetic risk factor in smoking Pharmacogenetics 1996; 6: 73-9.

Comings D E, Muhleman D, Ahn C, Gysin R, Flanagan S D. The dopamine D2 receptor gene: a genetic risk factor in substance abuse. Drug Alcohol Depend 1994; 34: 175-80.

Comings D E, Rosenthal R J, Lesieur H R, et al. A study of the dopamine D2 receptor gene in pathological gambling. Pharmacogenetics 1996; 6: 223-3.

Cooper S J, Dourish C T. Hypodipsia, stereotypy and hyperactivity induced by beta-phenylethylamine in the water-deprived rat. Pharmacol Biochem Behav. 1984, 20(1): 1-7.

Dilman V, Dean W. The Neuroendocrine Theory of Aging, The Center for Bio-Gerontology, Pensacola, 1992.

Dilman V. The Law of Deviation of Homeostasis and Diseases of Aging, John Wright. PSG, 1981.

Dilman, V. M., and Young, J. K. Development, Aging and Disease—A New Rationale for an Intervention Strategy. Harwood Academic Publishers, Chur, Switzerland, 1994.

Dourish C T, Boulton A A. The effects of acute and chronic administration of beta-phenylethylamine on food intake and body weight in rats. Prog Neuropsychopharmacol. 1981, 5(4): 411-414.

Dourish C T, et al. Deutrium substitution enhances the effects of b-phenylethylamine on spontaneous motor activity in the rat. Pharmacol. Biochem. Behav. 1983, 19: 471-475.

Dyck L E, Durden D A, Boulton A A. Formation of β-phenylethylamine from the antidepressant, β-phenylethylhydrazine. Biochem Pharmacol 1985; 34: 1925-9.

Fischer E, Spatz H, Heller B, Reggiani H. Phenethylamine content of human urine and rat brain, its alterations in pathological conditions and after drug administration. Experientia 1972; 28: 307-8.

Fuxe K, Grobecker H, Jonsson J. The effect of β-phenylethylamine on central and peripheral monoamine-containing neurons. Eur J Pharmacol 1967; 2: 202-7.

Greenshaw A J, Juorio A V, Boulton A A. Behavioral and neurochemical effects of deprenyl and β-phenylethylamine in in wistar rats. Brain Research Bulletin 1985, 15(2):183-189.

Greenshaw A J, Sanger D J, Blackman D E. Effects of d-amphetamine and of β-phenylethylamine on fixed interval responding maintained by self-regulated lateral hypothalamic stimulation in rats. Pharmacology Biochemistry and Behavior 1985, 23(4):519-523.

Greenshaw A J. Functional interactions of 2-phenylethylamine and of tryptamine with brain catecholamines: implications for psychotherapeutic drug action. Prog Neuropsychopharmacol Biol Psychiatry 1989; 13: 431-43.

Greenshaw A J. β-Phenylethylamine and reinforcement. Prog Neuropsychopharmacol Biol Psychiatry 1984; 8: 615-20.

Grimsby J, et al. Increased stress response and beta-phenylethylamine in MAOB-deficient mice. Nat Genet. 1997, 17(2): 206-210.

Grimsby J, Toth M, Chen K, et al. Increased stress response and beta-phenylethylamine in MAOB-deficient mice. Nat Genet 1997; 17: 206-10.

Janssen P A, Leysen J E, Megens A A, Awouters F H. Does phenylethylamine act as an endogenous amphetamine in some patients? Int J Neuropsychopharmcol 1999; 2: 229-240.

Kato M. et al β-Phenylethylamine modulates acetylcholine release in the rat striatum: involvement of a dopamine D2 receptor mechanism European Journal of Pharmacology 2001 418(1-2): 65-71.

Kim K-A, von Zastrow M. Old drugs learn new tricks: insights from mammalian trace amine receptors. Mol Pharmacol 2001; 60: 1165-7.

Knoll, J. Enhancer regulation/Endogenous and Synthetic Enhancer Compounds: A Neurochemical Concept of the Innate and Acquired Drives. Neurochem Res (2003) 28:1187-1209.

Knoll, J. et al (1996) (−)-Deprenyl and (−)-1-phenyl-2-propylaminopentane [(−)PPAP], act primarily as potent stimulants of action-potential-transmitter release coupling in the catecholaminergic neurons Life Sci 58, S17-27.

Knoll, J. et al Phenylethylamine and tyramine are mixed-acting sympathomimetic amines in the brain Life Sci 1996 58, 2101-14.

Knoll, J. Memories of my 45 years in research Pharmacol Toxicol 1994 75, 65-72.

Knoll, J. The Brain and Its Self: A Neurochemical Concept of Innate and Acquired Drives. (2005) Springer Verlag.

Knoll, J., 1998. (_)eprenyl (selegiline), a catecholaminergic activity enhancer (CAE) substance acting in the brain. Pharmacol. Toxicol. 82, 57-66.

Koch, R., Moats, R., Guttler, F., Guldberg, P. and Nelson, M. Blood-brain phenylalanine relationships in persons with phenylketonuria. Pediatrics 2000, 106:1093-1096.

Kusaga A, Yamashita Y, Koeda T, et al. Increased urine phenylethylamine after methylphenidate treatment in children with ADHD Ann Neurol 2002; 52: 372-4

Lawford B R, Young R M, Noble E P, et al. The D(2) dopamine receptor A(1) allele and opioid dependence: association with heroin use and response to methadone treatment. Am J Med Genet 2000; 96: 592-8.

Nakamura M, Ishii A, Nakahara D. Characterization of b-phenylethylamine-induced monoamine release in rat nucleus accumbens: a microdialysis study. Eur. J. Pharmacol. 1998, 349: 163-169.

Neuropsychiatr Genet 2003; 116: 103-25.

Noble E P. D2 dopamine receptor gene in psychiatric and neurologic disorders and its phenotypes. Am J Med Genet B 2003; 116B:103-125.

O'Hara B F, Smith S S, Bird G, et al. Dopamine D2 receptor RFLPs, haplotypes and their association with substance use in black and Caucasian research volunteers. Hum Hered 1993; 43: 209-18.

O'Reilly R, Davis B A, Durden D A, Thorpe L, Machnee H, Boulton A A. Plasma phenylethylamine in schizophrenic patients. Biol Psychiatry. 1991, 30(2): 145-150.

Paetsch P R, Baker G B, Greenshaw A J. Induction of functional down-regulation of β-adrenoceptors in rats by 2-phenylethylamine. J Pharm Sci 1993; 82: 22-4.

Parker E M, Cubeddu L X. Comparative effects of amphetamine, phenylethylamine and related drugs on dopamine efflux, dopamine uptake and mazindol binding. J Pharmacol Exp Ther 1988; 245: 199-210.

Paterson I A, Juorio A V, Boulton A A. 2-Phenylethylamine: a modulator of catecholamine transmission in the mammalian central nervous system? J. Neurochem. 1990, 55: 1827-1837.

Paul S M, Hulihan-Giblin B, Skolnick P. (+)-Amphetamine binding to rat hypothalamus: relation to anorexic potency for phenylethylamines. Science 1982; 218: 487-90.

Popplewell D A, Coffey P J, Montgomery A M, Burton M J. A behavioural and pharmacological examination of phenylethylamine-induced anorexia and hyperactivity—comparisons with amphetamine. Pharmacol Biochem Behav. 1986, 25(4): 711-716.

Raiteri M, Del Carmine R, Bertollini A, Levi G. Effect of sympathomimetic amines on the synaptosomal transport of noradrenaline, dopamine, and 5-hydroxytryptamine. Eur J Pharmacol 1977, 41: 133-143.

Risner M E, Jones B E. Characteristics of beta-phenethylamine self administration by dog. Pharmacol Biochem Behav 1977; 6: 689-96.

Sabelli H C, Javaid J I. Phenylethylamine modulation of affect: therapeutic and diagnostic implications. J Neuropsychiatry Clin Neurosci. 1995, 7(1): 6-14.

Sabelli, H. (1998). Phenylethylamine replacement as a rapid and physiological treatment for depression. Psycheline, 2, (3), 32-39.

Sabelli, H. (2000). Aminoacid precursors for depression. Psychiatric Times, 17. 42-49.

Sabelli, H. (2002). Phenylethylamine deficit and replacement in depressive Illness. In D. Mishooulon and J. F. Rosenbaum. (Eds.), Natural medications for psychiatric disorders. (pp 83-110), Baltimore: Lippencott Williams and Wilkins.

Sabelli, H., Fink, P., Fawcett, J. and Tom, C. (1996). Sustained antidepressant effect of PEA replacement. Journal of Neuropsychiatry and Clinical Neurosciences, 8, 168-171.

Sabelli, H. C and Javaid J. I. (1995). Phenylethylamine modulation of affect: Therapeutic and diagnostic implications. Journal of Neuropsychiatry and Clinical Neurosciences, 7, 6-14.

Sabelli, H. C., Fahrer, R, Doria Medina R, and Ortiz Frágola E. (1994). Phenylethylamine replacement rapidly relieves depression. Journal of Neuropsychiatry, 6, 203.

Scriver, C. R. and Kaufman, S. Hyperphenylalaninemia: Phenylalanine Hydroxylase Deficiency. In, The Metabolic and Molecular Basis of Inherited Disease. 8th Edition, 2001. Scriver, Beaudet, et al. McGraw-Hill. Chapter 77, pg. 1667-1724.

Shannon H E, Thompson W A. Behavior maintained under fixedinterval and second-order schedules by intravenous injections of endogenous noncatecholic phenylethylamines in dogs. J Pharmacol Exp Ther 1984; 228: 691-5.

Smith T A. Phenylethylamine and related compounds in plants. Phytochemistry 1977, 16: 9-18.

Szabo A, Billett E, Turner J. Phenylethylamine, a possible link to the antidepressant effects of exercise? Br J Sports Med 2001; 35: 342-3.

Takahashi N. Dopaminergic genes and substance abuse. Adv Pharmacol 998; 42: 1024-32.

Wolf M E, Mosnaim A D. Phenylethylamine in neuropsychiatric disorders. Gen Pharmacol 1983; 14: 385-90.

Xie Z, Miller G M. Beta-phenylethylamine alters monoamine transporter function via trace amine-associated receptor 1: implication for modulatory roles of trace amines in brain. Pharmacology and Experimental Therapeutics 2008 May: 325(2):617-28.

Xie, Z., Miller, G. M., Trace Amine-Associated Receptor 1 Is a Modulator of the Dopamine Transporter. April 2007 vol. 321 no. 1 128-136 Reynolds G P. Phenylethylamine—a role in mental illness. Trends Neurosci 1979; 2: 265.

Yu P H. Pharmacological and clinical implications of MAO-B inhibitors. Gen Pharmacol. 1994, 25(8): 1527-1539. Berry, M. D., The Potential of Trace Amines and Their Receptors for Treating Neurological and Psychiatric Diseases. Reviews on Recent Clinical Trials, 2007, 2, 3-19 3.

Zametkin A J, Karoum F, Rapoport J L, Brown G L, Wyatt R J. Phenylethylamine excretion in attention deficit disorder. J Am Acad Child Psychiatry 1984; 23: 310-4.

The invention claimed is:

1. A dietary supplement comprising a nitrate and/or nitrite of a phenylethylamine selected from the group consisting of 2-phenylethylamine, hordenine; N-methyl-tyramine, halostachine, synephrine, octopamine, N-benzyl-2-phenylethylamine, N-benzoyl-2-phenylethylamine, N-methyl-2-phenylethylamine, N-ethyl-1-phenyl-propan-2-amine, phenylephrine, epinephrine, norepinephrine, dopamine, tyramine, phentermine, and 2-methyl-phenylethylamine, wherein the nitrate is $NO_3^-$ and the nitrite is $NO_2^-$.

2. The dietary supplement of claim 1, wherein the supplement is formulated to deliver a, effective amount of the nitrate and/or nitrite of a phenylethylamine to increase the athletic performance and/or sexual function of a subject.

3. The dietary supplement of claim 1, wherein the supplement is formulated to deliver a, effective amount of the nitrate and/or nitrite of a phenylethylamine to suppress the appetite of the subject.

4. The dietary supplement of claim 1, further comprising one or more additional components selected from the group consisting of monoamine oxidase inhibitors, vitamins, lipids, carbohydrates, amino acids, trace elements, colorings, flavors, artificial sweeteners, natural health improving substances, antioxidants, stabilizers, stimulants, hypoglycemic agents, preservatives, and buffers.

5. The dietary supplement of claim 1, wherein the supplement is formulated as a single serving and contains from about 0.005 grams to about 3.000 grams of the nitrate and/or nitrite of a phenylethylamine.

6. The dietary supplement of claim 1, wherein the supplement is formulated in a dosage form selected from the group consisting of a tablet, a chewable tablet, a capsule, a caplet, a lozenge, a troche, a, oral gel, a buccal pouch, a granule, a pill, a gel, a bar, a pudding, and a powder.

7. A Composition comprising a nitrate and/or nitrite of a phenylethylamine selected from the group consisting of 2-phenylethylamine, hordenine; N-methyl-tyramine, halostachine, synephrine, octopamine, N-benzyl-2-phenylethylamine, N-benzoyl-2-phenylethylamine, N-methyl-2-phenylethylamine, N-ethyl-1-phenyl-propan-2-amine, phenylephrine, epinephrine, norepinephrine, dopamine, tyramine, phentermine, and 2-methyl-phenylethylamine, wherein the nitrate is $NO_3^-$ and the nitrite is $NO_2^-$.

8. The Composition of claim 7 in a single unit dosage form comprising a, effective amount of the nitrate and/or nitrite of a phenylethylamine.

9. The Composition of claim 8, wherein the effective amount is from about 0.005 grams to about 3.000 grams.

* * * * *

UNITED STATES PATENT AND TRADEMARK OFFICE
CERTIFICATE OF CORRECTION

PATENT NO. : 9,526,793 B1
APPLICATION NO. : 13/917023
DATED : December 27, 2016
INVENTOR(S) : Ronald Kramer et al.

Page 1 of 1

It is certified that error appears in the above-identified patent and that said Letters Patent is hereby corrected as shown below:

In the Claims

Column 27 Line 26 reads "a, effective" it should read - an effective -

Column 27 Line 30 reads "a, effective" it should read - an effective -

Column 28 Line 15 reads "a, oral" it should read - an oral -

Column 28 Line 27 reads "a, effective" it should read - an effective -

Signed and Sealed this
Twenty-fourth Day of July, 2018

Andrei Iancu
*Director of the United States Patent and Trademark Office*